United States Patent [19]

Norita et al.

[11] Patent Number: 4,792,820
[45] Date of Patent: Dec. 20, 1988

[54] CAMERA WITH AUTOMATIC FOCUS AND EXPOSURE CONTROL MEANS

[75] Inventors: Toshio Norita, Sakai; Nobuyuki Taniguchi, Nishinomiya; Tokuji Ishida, Daito; Toshihiko Karasaki, Sakai; Masataka Hamada, Osaka, all of Japan

[73] Assignee: Minolta Camera Kabushiki Kaisha, Osaka, Japan

[21] Appl. No.: 905,974

[22] Filed: Sep. 11, 1986

[51] Int. Cl.$^4$ .................... G03B 3/10; G03B 7/091
[52] U.S. Cl. .................... 354/402; 354/409; 354/410; 354/433
[58] Field of Search ............... 354/400, 409, 402, 410, 354/412, 429, 431, 432, 433, 434

[56] References Cited

U.S. PATENT DOCUMENTS

| | | | |
|---|---|---|---|
| 4,322,142 | 3/1982 | Kawamura et al. | 354/431 X |
| 4,464,037 | 8/1984 | Terui et al. | 354/400 |
| 4,491,403 | 1/1985 | Sakai et al. | 354/402 X |
| 4,514,073 | 4/1985 | Taniguchi et al. | 354/431 X |
| 4,609,274 | 9/1986 | Iwashita et al. | 354/400 |

Primary Examiner—W. B. Perkey
Attorney, Agent, or Firm—Burns, Doane, Swecker & Mathis

[57] ABSTRACT

A camera with an AF and AE control structure including a one-shot AF mode and a continuous AF mode, in which the operability and exposure control are improved. The camera includes a unit for detecting a focusing condition of an objective lens, defined by the relationship between a position of an object to be photographed against the lens and a focus point of the lens; a unit for focusing the lens in accordance with the detected focusing condition so that the lens is moved to the in-focus position, a first light measurement unit for measuring light at a spot area corresponding to a region of the object to be detected at the detecting unit, a second light measurement means for measuring averaged light at another area broader than the first area, and a unit for controlling exposure amount. The exposure control unit determines the exposure amount on the basis of the spot metering data in a one-shot AF mode, or the averaged light measuring data which is defined as a data at a time, at least, when the lens is adjacent to the in-focus position, in a continuous AF mode.

42 Claims, 21 Drawing Sheets

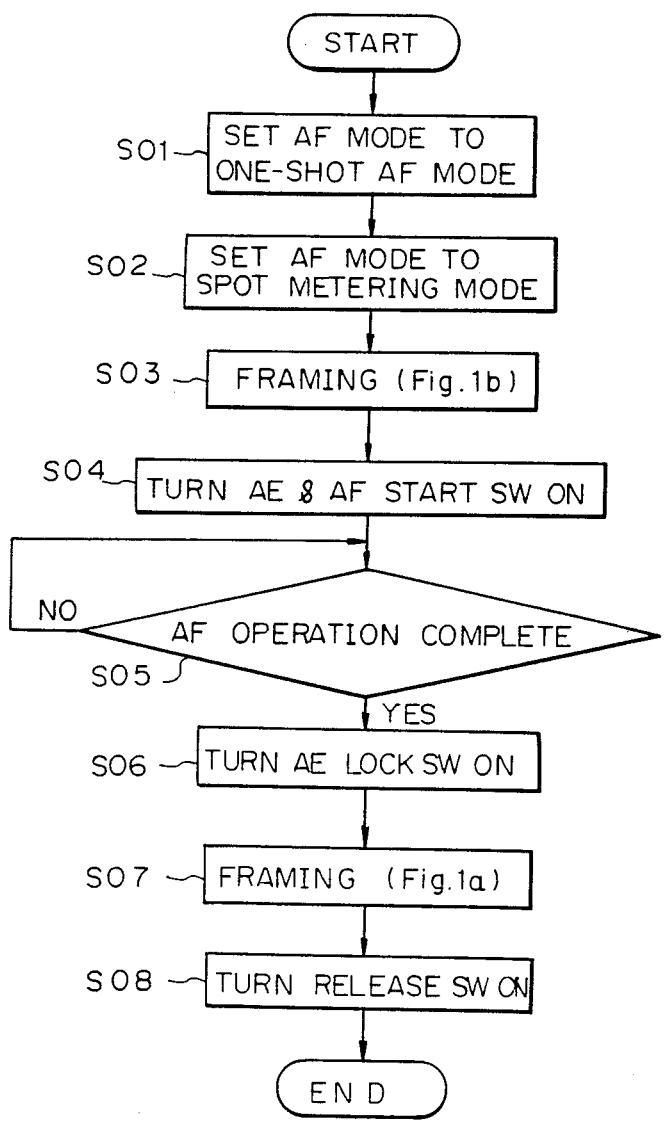

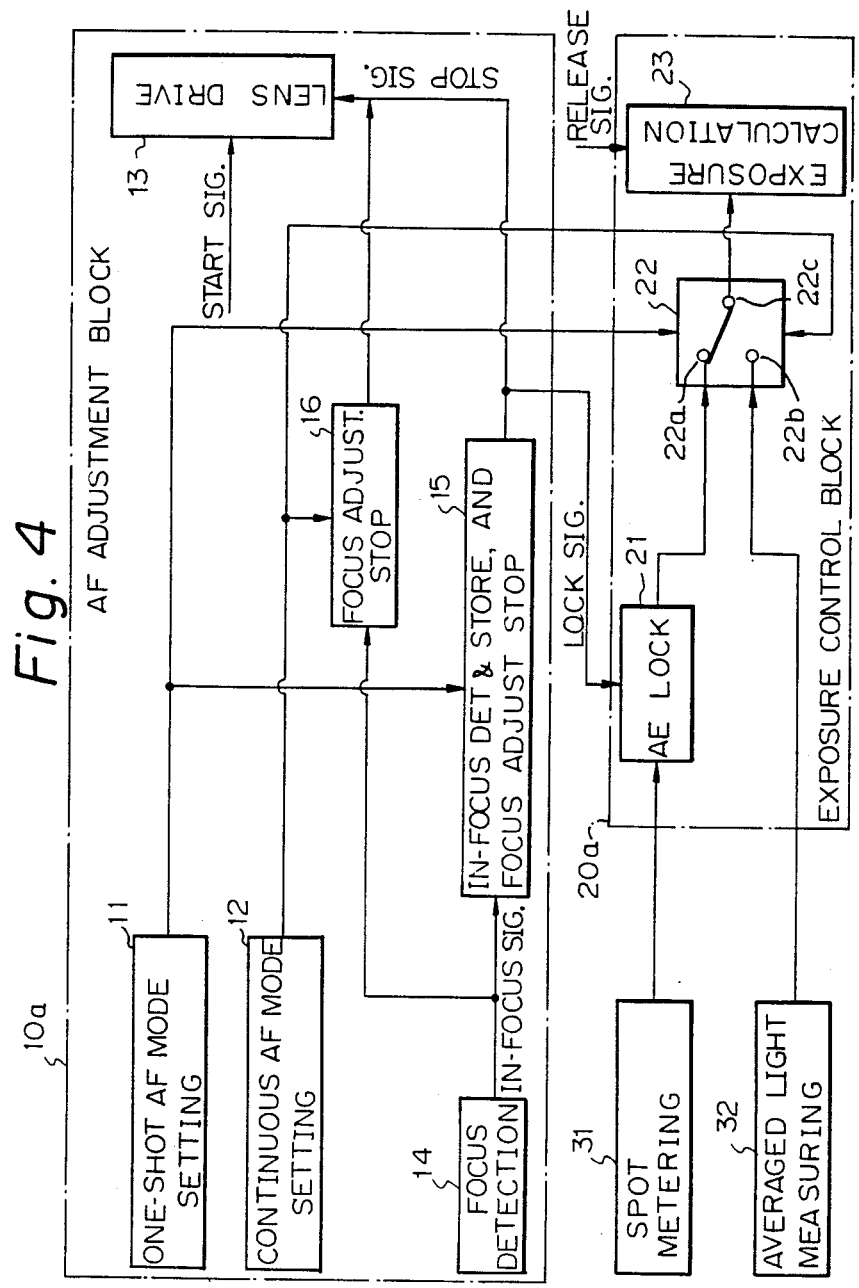

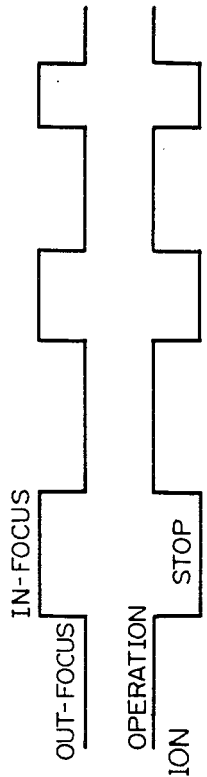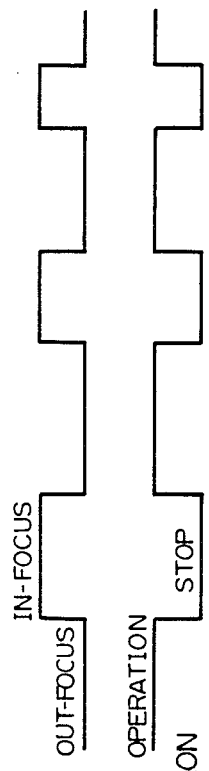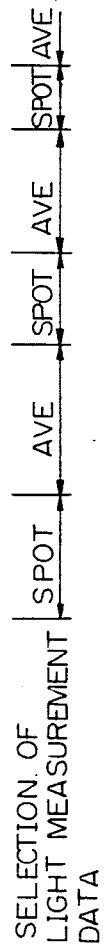
Fig. 7a IN-FOCUS SIG.
Fig. 7b AF OPERATION
Fig. 10a IN-FOCUS SIG.
Fig. 10b AF OPERATION
Fig. 10c SELECTION OF LIGHT MEASUREMENT DATA

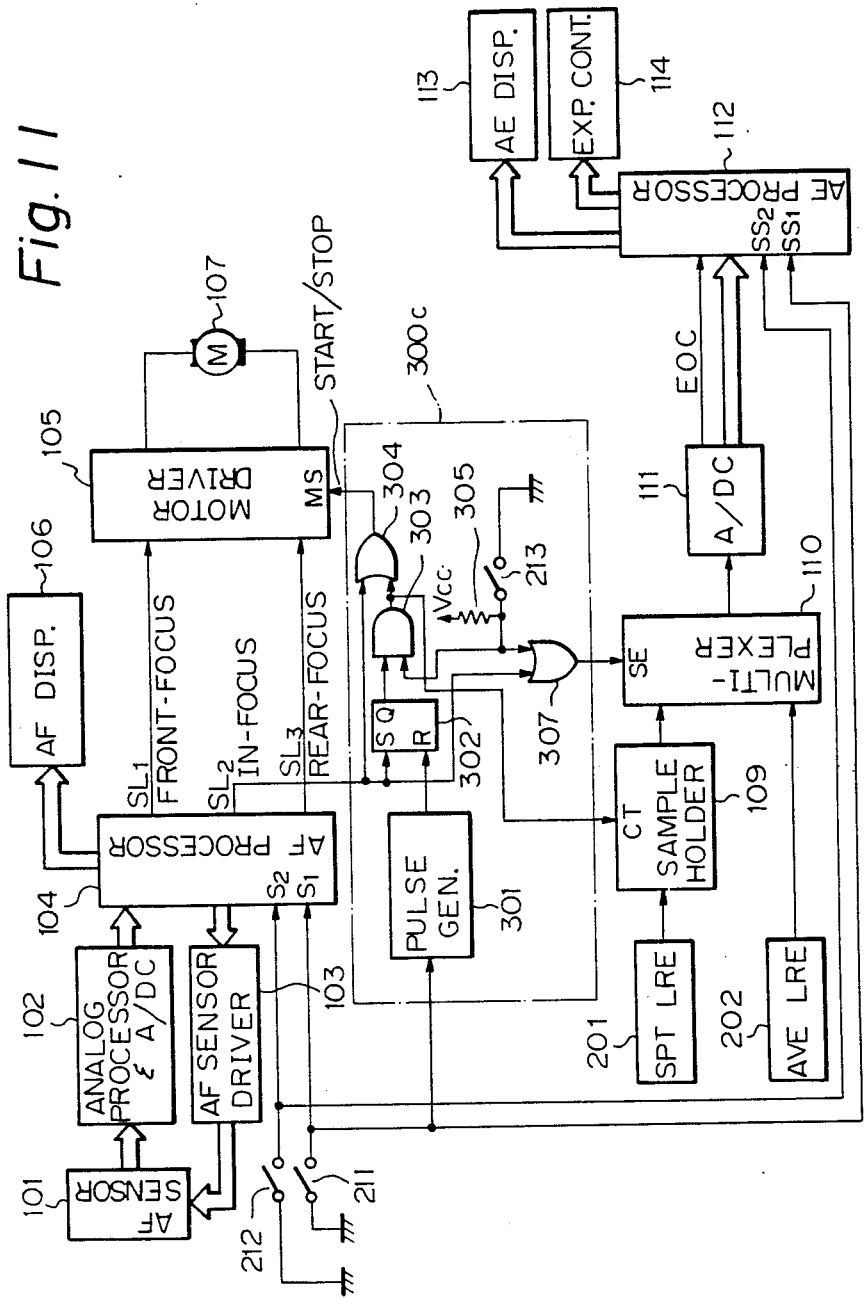

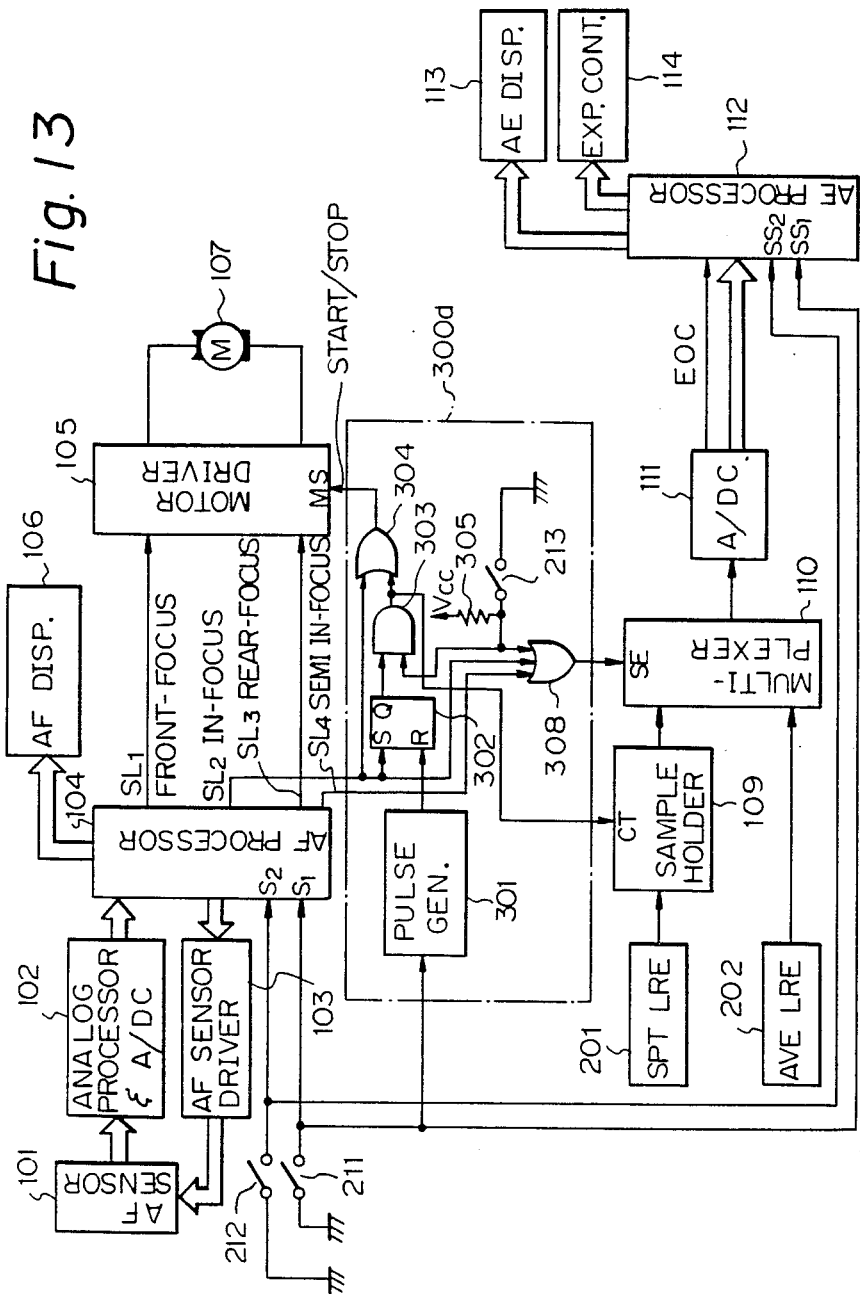

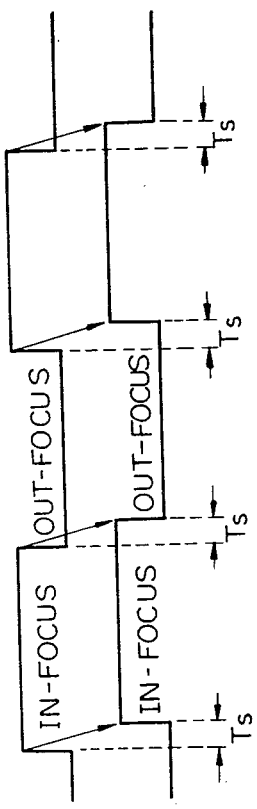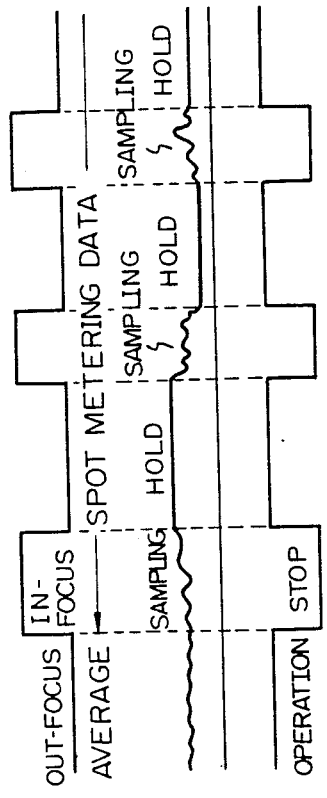

Fig. 19a LENS
Fig. 19b IN-FOCUS SIG.
Fig. 19c SAMPLING MODE

CAMERA WITH AUTOMATIC FOCUS AND EXPOSURE CONTROL MEANS

BACKGROUND OF THE INVENTION (1) Field of the Invention

The present invention relates to a camera. More particularly, it relates to a camera with automatic focus and exposure (AF and AE) control means and improved operability and exposure performance.

(2) Description of the Related Arts

Cameras with AF and AE control means are extensively known.

Japanese Unexamined Utility Model Publication No. 53-148638, entitled "a control apparatus of a camera" and published on Nov. 12, 1978, discloses a camera in which light-measured data is stored in a memory immediately before a mirror-up operation is effected in a one-shot AF mode wherein the exposure is controlled on the basis of spot metering (spot light measuring) data. The AF operation is stopped when an objective lens (or taking lens) reaches an in-focus position defined by the relationship between a focus position of the lens and a position of an object to be photographed against the lens. Simultaneously, the spot metering data is stored in another memory by activating a switch other than that for storing the above light-measured data. Upon operation of the shutter release, the exposure control is effected on the basis of the stored spot metering data. In this camera, the exposure can be controlled with the spot metering data or with the averaged light measuring data, and thus, the exposure control may be effected on the basis of the latest light-measured data, either the spot metering data or the averaged light measuring data, at a time immediately before the shutter release operation after the focusing operation of the object lens is completed.

However, the above camera does not have a continuous AF function as provided in the present invention, but has a feature wherein the AF operation is restarted if the lens moves out of the in-focus position after the lens was once fixed (locked) at the in-focus position. In this case, the previous in-focus operation must be released and a new in-focus operation carried out. Accordingly, the above camera has disadvantages involving manual operability and speed.

Japanese Unexamined Patent Publication No. 58-120225, entitled "camera" and published on July 18, 1983, discloses a camera having a one-shot AF mode and a servo AF mode. In the one-shot AF mode, the exposure control is effected on the basis of the averaged light-measuring data stored in a memory by the shutter release operation after fixing the lens at the in-focus position. In the servo AF mode, the exposure control is effected on the basis of the spot metering data. Upon pushing down the release button to a first stage, the lens is fixed regardless of whether the lens is in or out of the in-focus position, and the spot metering data is stored. The exposure control is effected on the basis of the stored spot metering data when the release button is pushed down to a second stage. Namely, the averaged light-measuring data in the one-shot AF mode and the spot metering data in the servo AF mode are unconditionally used This type of camera has the disadvantages of insufficient exposure control and low operability. In the one-shot AF mode, the spot metering data against a main object to be photographed may not provide sufficient exposure. On the other hand, in the servo AF mode, when the main object, for example, a moving car, moves out the spot metering area after the averaged light-measuring data has been stored, a large illuminance (brightness) difference between the stored data used for calculating the exposure and a current light data may exist, and accordingly, the picture taken may be insufficiently exposed.

SUMMARY OF THE INVENTION

An object of the present invention is to provide a camera having an AF and AE control means by which the operability for a stationary object and a moving object is improved.

Another object of the present invention is to provide a camera having an AF and AE control means whereby the exposure for a moving object is improved.

Still another object of the present invention is to provide a camera having an AF and AE control means whereby the exposure for a moving object is further improved together an improved operability.

Yet another object of the present invention is to provide a camera having an AF and AE control means whereby the exposure for a moving object is further improved even if the release operation is executed in a transition time in which the light measurement data is changing.

According to a first aspect of the present invention, there is provided a camera with an automatic focus and exposure (AF and AE) control means, including: a unit for detecting a focusing condition of an objective lens attached to the camera to produce a focusing signal indicative of the detected focusing condition; a unit for selecting either a first operation mode or a second operation mode; and a unit, operatively connected to the detecting unit and the selecting unit, for focusing the objective lens in accordance with the focusing signal to produce an in-focus signal when the in-focus condition of the objective lens is detected by the detecting unit. The operation of the focusing unit is interrupted after the in-focus condition has once been detected when the first operation mode is selected, while the operation of the focusing unit is repeated in accordance with the focusing signal even if an out-of-focus condition is detected again after the in-focus condition has once been detected when the second operation mode is selected. The camera also includes a first light measurement unit for measuring light coming from a first measuring area, the light from which is received by the detecting unit for detecting the focusing condition of the objective lens to produce a first light measuring signal indicative of the intensity of light measured; a second light measurement unit for measuring light coming from a second measuring area larger than the first measuring area to produce a second light measuring signal indicative of the intensity of light measured; and an exposure control unit, operatively connected to the first and second light measurement units, the selecting unit and the focusing unit, for controlling exposure amount on the basis of the first light measuring signal produced when the in-focus signal is produced in the condition in which the first operation mode is selected, and for controlling exposure amount on the basis of the second light measuring signal independently of the in-focus signal in the condition in which the second operation mode is selected.

In the first operation mode, the first light measured data is latched when the focusing of the lens is achieved, and the exposure control is effected by using the same. In the second operation mode, the exposure control is effected by using the second light measured data.

The manual operations for AE mode change and AE lock are omitted.

According to a second aspect of the present invention, there is also provided a camera with an automatic focus and exposure (AF and AE) control means, including: a unit for detecting a focusing condition of an objective lens attached to the camera to produce a focusing signal indicative of the detected focusing condition; a unit, operatively connected to the detecting unit, for focusing the objective lens in accordance with the focusing signal to produce an in-focus signal when the in-focus condition of the objective lens is detected by the detecting unit, the operation of the focusing unit being repeated in accordance with the focusing signal even if an out-of-focus condition is detected again after the in-focus condition has once been detected; a first light measurement unit for measuring light coming from a first measuring area, the light from which is received by the detecting unit for detecting the focusing condition of the objective lens to produce a first light measuring signal indicative of the intensity of light measured; a second light measurement unit for measuring light coming from a second measuring area larger than the first measuring area to produce a second light measuring signal indicative of intensity of light measured; and an exposure control unit, operatively connected to the first and second light measurement units and the focusing unit, for controlling exposure amount on the basis of the first light measuring signal when the in-focus signal is produced at a time of starting the exposure control operation, and for controlling exposure amount on the basis of the second light measuring signal when the in-focus signal is not produced at a time of starting the exposure control operation.

In the first operation mode, the first light measured data is latched when the focusing of the lens is achieved, and the exposure control is effected by using the same. In the second operation mode, the exposure control is effected by using the first light measured data when the focusing of the lens is achieved, or the second light measured data at any other time.

According to a third aspect of the present invention, there is provided a camera with an automatic focus and exposure (AF and AE) control means, including: a unit for detecting a direction of defocus of an objective lens and amount of defocus thereof with respect to a predetermined focal plane; a unit operatively connected to the detecting unit, for focusing the objective lens in accordance with the detected direction of defocus and the detected amount of defocus to stop the focusing of the objective lens when the detected amount of defocus becomes smaller than a predeterminded first amount; a first light measurement unit for measuring light coming from a first measuring area, the light from which is received by the detecting unit for detecting the direction of defocus and the amount of defocus of the objective lens to produce a first light measuring signal indicative of the intensity of light measured; a second light measurement unit for measuring light coming from a second measuring area larger than the first measuring area to produce a second light measuring signal indicative of the intensity of light measured; and an exposure control unit, operatively connected to the first and second light measurement units and the focusing unit, for controlling exposure amount on the basis of the first light measuring signal when the in-focus signal is produced at a time of starting the exposure control operation, and for controlling exposure amount on the basis of the second light measuring signal when the in-focus signal is not produced at a time of starting the exposure control operation.

Preferably, the focusing unit produces a semi in-focus signal when the detected amount of defocus becomes smaller than a predetermined second amount which is determined as being larger than the predetermined first amount. The exposure control unit controls exposure amount on the basis of the first light measuring signal when the semi in-focus signal is produced at a time of starting the exposure control operation.

According to the present invention, there is provided a camera with an AF and AE control structure including: a unit for detecting a focusing condition of an objective lens attached to the camera to produce a focusing signal indicative of the detected focusing condition; a unit, operatively connected to the detecting unit, for focusing the objective lens in accordance with the focusing signal to produce an in-focus signal when the in-focus condition of the objective lens is detected by the detecting unit, the operation of the focusing unit being repeated in accordance with the focusing signal even if an out-of-focus condition is detected again after the in-focus condition has once been detected; a light measurement unit for repeatedly measuring light coming from a measuring area, the light frmm which is received by the detecting unit for detecting the focusing condition of the objective lens to repeatedly produce a light measuring signal indicative of the intensity of light measured; a unit for updating said light measuring signal while the in-focus signal is being produced and for holding a last light measuring signal just until the in-focus signal is produced; and a unit, operatively connected to the update and holding unit, for controlling exposure amount on the basis of said held light measuring signal.

According to the present invention, there is also provided a camera including: a unit for detecting a focusing condition of an objective lens attached to the camera to produce a focusing signal indicative of the detected focusing condition; a unit, operatively connected to the detecting unit, for focusing the objective lens in accordance with the focusing signal to produce an in-focus signal when the in-focus condition of the objective lens is detected by the detecting unit; a first light measurement unit for measuring light on an area corresponding to a region of an object to be detected at said detecting unit; a second light measurement unit for measuring light on another area broader than the first area; a unit, operatively connected to the first and second light measurement units and the focusing unit, for controlling exposure amount. The exposure contool unit determines the exposure amount on the basis of a first data from the first light measurement unit, or a second data from the second light measurement unit when the in-focus signal is produced.

BRIEF DESCRIPTION OF THE DRAWINGS

Other objects and features of the present invention will be clearly understood with reference to the accompanying drawings, in which:

FIG. 2 is a block chart showing the prior art AF and AE operation;

FIG. 4 is a block diagram of a first conceptual embodiment of a camera including the AF and AE control means in accordance with the present invention;

FIGS. 7a and 7b are timing charts showing the operation of the circuit in FIG. 6;

FIGS. 10a, 10b, and 10c are timing charts showing the operation of the AF and AE control means shown in FIG. 9;

FIGS. 11, 12, and 13 are circuit diagrams of first, second, and third embodiments of the camera shown in FIG. 9;

FIGS. 14a and 14b are timing charts for the circuits shown in FIGS. 11 to 13;

FIGS. 16a, 16b, and 16c are timing charts illustrating the operation of the AF and AE control means shown in FIG. 15;

DESCRIPTION OF THE PREFERRED EMBODIMENTS

Before describing preferred embodiments of the present invention, a more specific description will be given of a primitive example of an AF type camera, for reference.

Figure 1A:
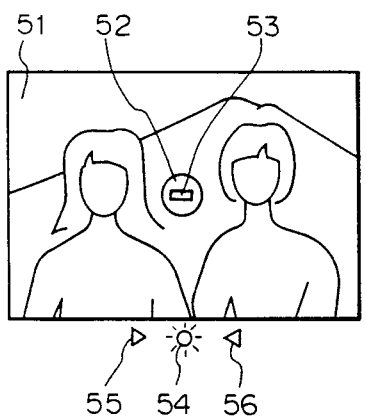
FIGS. 1a and 1b are views representing framing on stationary main objects.
Figure 1B:
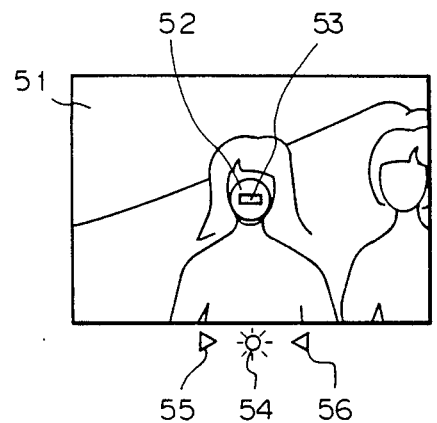

A one-shot AF mode of a primitive example of an AF type camera will be described with reference to FIGS. 1a, 1b, and FIG. 2. In FIGS. 1a and 1b, a circle spot metering area (stop light measuring area) 52 exists in a center of a finder field 51 and a rectangular focus detection sensitivity area 53 exists inside of the spot metering area 52. Below the finder field 51 are provided indicators 54, 55, and 56 displaying focus information obtained by a focus detecting unit. The indicator 54 is turned ON when an objective lens is placed in an in-focus position; the indicator 55 is turned ON when the objective lens is placed in a front-focus position; and, the indicator 56 is turned ON when the lens is placed in a rear-focus position. In the one shot AF mode, when the lens is once moved to the in-focus position, the in-focus indicator 54 is turned ON and the lighting is maintained. On the other hand, when a brightness distribution obtained in the focus detection unit is in a low contrast state, both the front-focus indicator 55 and the rear-focus indicator 56 are turned ON.

In FIGS. 1a and 1b, the main object to be photographed is almost stationary. Accordingly, the operation of the camera is performed as shown in FIG. 2, when a user takes a photograph with the framing shown in FIG. 1a. Since the main object is stationary, and thus a distance between the camera, more precisely, the lens, and the main object is almost constant, the user first sets the AF operation mode to the one shot AF mode at step S01, and then sets the AE mode to the spot metering mode at step S02. At step S03, the user adjusts the framing through the finder field 51 so that the focus detection sensitiviy area 53 and the spot metering area 52 are at the main object, as shown in FIG. 1b. This framing will be maintained until the completion of step S06. At step S04, an AF and AE start switch is made ON, starting an AF operation and an AE operation. When the AF operation is completed (step S05), the lens is fixed at a position wherein the lens is in-focus and the in-focus indicator 54 is turned ON and kept ON. The AF operation is shown to be completed by the lighting of the in-focus indicator 54. After completion of the AF operation, when an AE lock switch is turned ON (step S06), the light-measured data for the position of the focus detection sensitivity area 53 at the main object is latched. At this stage, the information for taking a photograph is established. In order to obtain the frame for the photograph at the condition as shown in FIG. 1a, the framing is effected (step S07). Subsequently, when a release switch is turned ON at step S08, a shutter of the camera is released, taking the photograph.

When the main object is stationary, the one-shot AF mode and the spot metering mode are adopted, as set forth above. However, the operation for setting the AE mode to the spot metering mode, as shown in step S02 is required when the one-shot AF mode is selected, and another operation for turning the AE lock switch ON as shown in step S06 is also required. Accordingly, more manual operations are required for taking the photograph.

Next, a primitive example of a continuous AF operation will be described with reference to FIGS. 3a and 3b. In this case, the main object is a moving object, e.g., a moving car, and thus a distance between the camera and the main object will vary from moment to moment. The continuous AF mode is set to change the position of the lens in response to the change of the distance between the camera and the object to be photographed. However, this continuous AF mode differs from a continuous AF mode of the present invention, set forth later in detail, and this difference will be understood from the description of embodiments of the present invention.

Figure 3A:
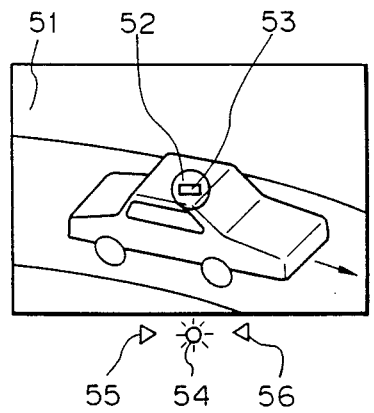
FIGS. 3a and 3b are views representing framing on a moving main object.

When the main object is moving it is very difficult to constantly hold the spot metering area 52 and the focus detection sensitivity area 53 in the center of the finder field 51 on the main object, as shown in FIG. 3a. As a result, the main object moves away from the spot metering area 52 and the focus detection sensitivity area 53, resulting in frequent and large fluctuations of the brightness distribution.

To alleviate these large fluctuations of the brightness distribution, an approach whereby the brightness distribution data is neglected when there is a large brightness distribution is used, and the AF adjustment operation is restarted by using a next measured brightness distribution. This approach, however, still involves a disadvantage of insufficient exposure, as set forth immediately below. When the spot metering mode is selected in the continuous AF mode, the shutter operation may be effected in a condition where the main object is not in the center of the finder field 51, and the exposure control may be performed by using another spot metering data from another object which is not the main object in question, and which may be in the background far away from the main object. When the deviation of the brightness distribution between the main object and this other object is large, a proper exposure for taking the picture cannot be obtained.

Now, embodiments of a camera to which an AF and AE control of the present invention is applied will be described with reference to the accompanying drawings.

Figure 5:
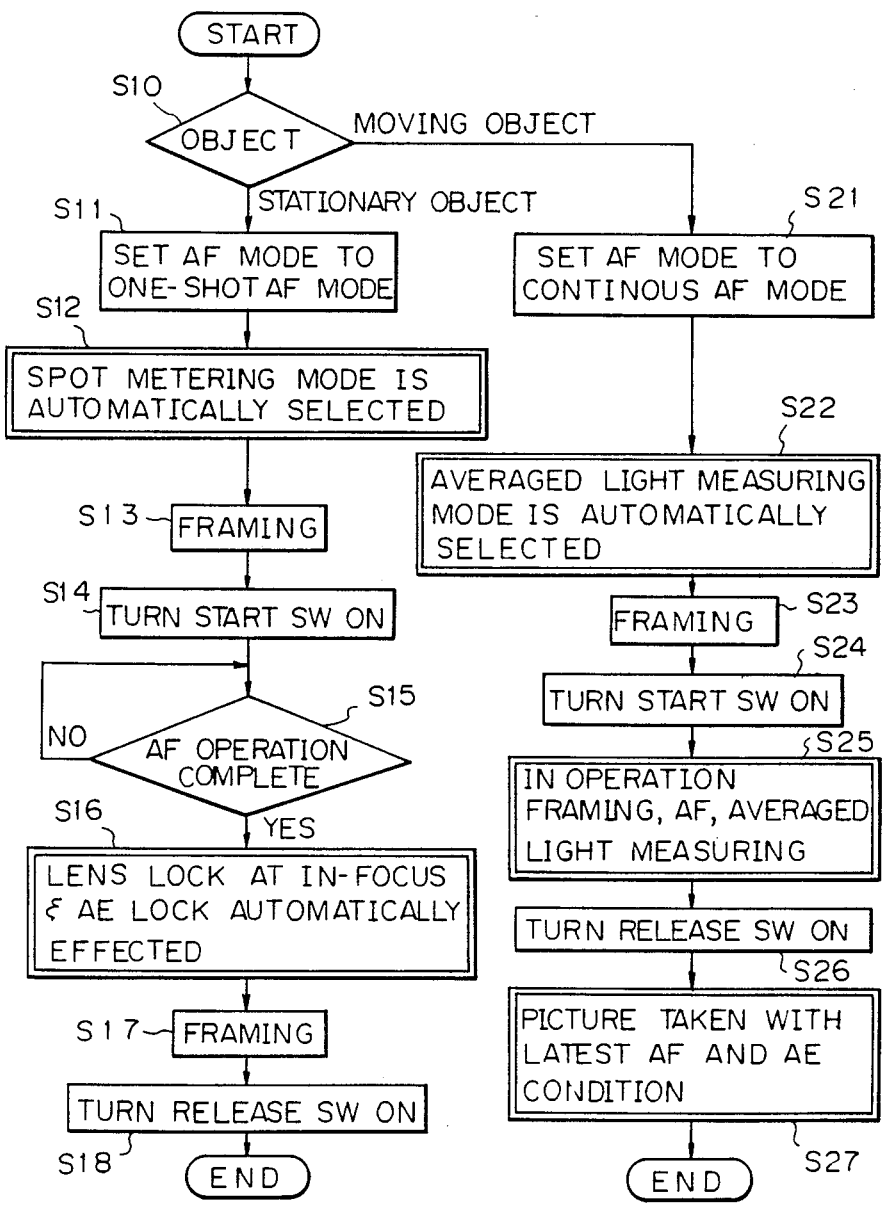
FIG. 5 is a block chart showing the operation of the AF and AE control means shown in FIG. 4.

Referring to FIGS. 4 and 5, a first conceptual embodiment of the present invention will be described. In FIG. 4, a camera includes the AF and AE control device consisting of an AF adjustment block 10a, an AE control block 20a, a spot metering unit 31 and an averaged light measuring unit 32, a lens system, a drive unit (not shown in FIG. 4) for moving an objective lens unit, including at least an objective lens, a mechanism (not shown in FIG. 4), and a control unit (not shown in FIG. 4) for controlling exposure. The AF adjustment block 10a includes a one-shot AF mode setting unit 11, a continuous AF mode setting unit 12, a lens drive unit 13, a focus detection unit 14, a unit 15 for detecting the in-focus condition and storing the same, and stopping the focus adjustment, and a focus adjustment stop unit 16. The exposure control block 20a includes an AE lock unit 21, a switching unit 22 for selecting light-measured signals, and an exposure calculation unit 23.

The AF and AE control device may be applied to a single-lens reflex camera.

First, the operation will be described when the main object is stationary as shown in FIGS. 1a and 1b.

As shown in FIG. 5, when a stationary object is to be photographed, the user of the camera selects step S11. At step S11, the one shot AF mode is selected through the one-shot AF mode setting unit 11 by a manual operation which energizes the in-focus detection and store and focus adjustment stop unit 15 and the switching unit 22 to operatively connect the spot metering unit 31 to the exposure calculation unit 23 through the AE lock unit 21 (step S12). Note that the operation at step S02 in FIG. 2 is omitted. Next, the framing is effected to place the main object in the focus detection sensitivity area 53 and the spot metering area 52 (S12). When the lens unit is moved to the in-focus position by driving the lens drive unit 13 in response to the operation of the focus detection unit 14, the motion of the lens unit is stopped by the in-focus detection and store and focus adjustment stop unit 15 and the lens drive unit 13, fixing the lens at that position. At the same time, the spot metering data to be applied to the exposure calculation unit 23 is latched at the AE lock unit 21, i.e., AE locking is effected. This AE locking is effected without making the AE lock switch ON, as described at step S06 in FIG. 2. A second framing is effected in the same way as at step S13. A release signal is then supplied to the exposure calculation unit 23, and accordingly, the exposure calculation unit 23 controls the exposure on the basis of the spot metering data latched in the AE lock unit 21.

The exposure calculation determines a combination of an aperture value of the lens and a shutter speed for suitably exposing the object on a film on the basis of a brightness of the light-measured object and a sensitivity of the film to be used. The exposure control controls an aperture of the aperture diaphram and a shutter open time.

As mentioned above, when the one-shot AF mode is selected, the light-measuring of the spot metering mode is automatically set. In addition, when the lens unit reaches the in-focus position the fixing of the lens unit at that position and the AE locking are automatically effected (step S16).

Figure 3B:
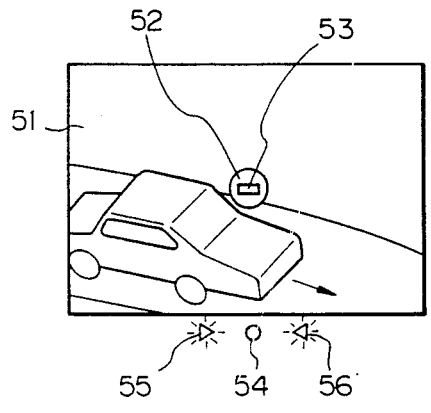

When the main object is moving as shown in FIGS. 3a and 3b, the continuous AF mode is selected by a manual operation by means of the continuous AF mode setting unit 12 (step S21), which energizes the focus adjustment stop unit 16 and connects the averaged light measuring unit 32 to the exposure calculation unit 23 through the switching unit 22, thus automatically selecting the averaged light measuring mode (step S22). As the framing is effected together with the tracking of the moving object, to place the moving object in the focus detection sensitivity area 53 (S23), the AF adjustment block 10a, specifically the focus detection unit 14, the focus adjustment stop unit 16, and the lens drive unit 13, activate the lens unit to drive the lens unit to the in-focus position. When the len unit reaches the in-focus position, the focus adjustment stop unit 16 outputs a stop signal to the lens drive unit 13, temporarily fixing the lens unit at that position. In this case, since the main object is moving, the distance between the lens unit of the camera and the main object will vary from moment to moment, even after the lens unit has been fixed as set forth above. Accordingly, the above AF operation for placing the lens unit at the in-focus position may be continuously effected (step S25). The averaged light measured data from the averaged light measuring unit 32 is also consecutively supplied to the exposure calculation means 23. Under these conditions, when the release signal is sent to the exposure calculation unit 23 (step S26), the exposure calculation unit 23 calculates the exposure on the basis of the latest averaged light measured data, and performs the exposure control on the basis of the calculated exposure (step S27).

As clearly understood from the above description, when the continuous AF mode is selected for photographing a moving object, the averaged light measuring mode is automatically selected, reducing the manual operability. In addition, the moving object is tracked and placed in the focus detection sensitivity area 53, whereby a satisfactory exposure control may be achieved. Even if the moving object is not in the focus detection sensitivity area 53 when the release signal is supplied to the exposure calculation unit 23, the latest averaged light measured data, which is continuously updated and which is the latest averaged light measured data, is used for controlling the exposure, and thus the exposure of the main object is most satisfactory.

More specific embodiments of the above conceptual first embodiment of the present application will now be described.

Figure 6:
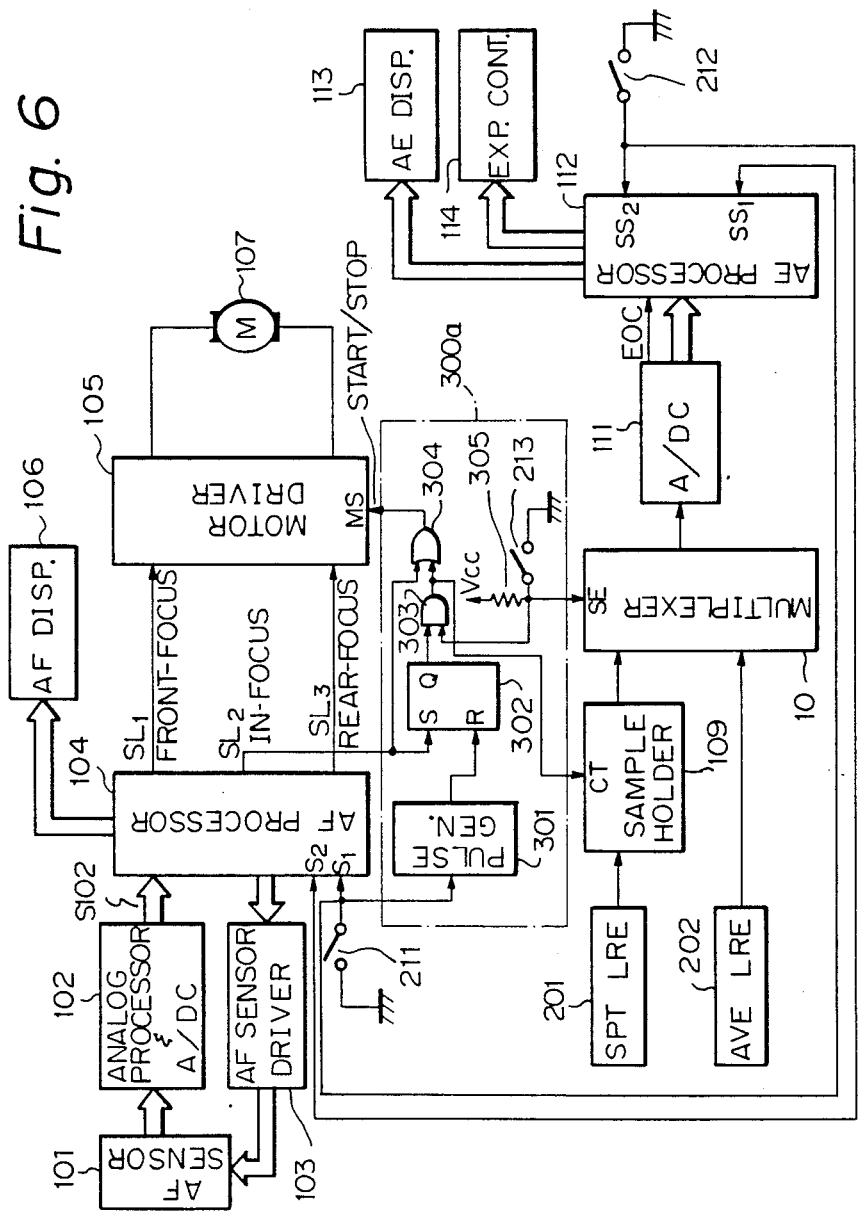
FIG. 6 is a circuit diagram of a first concrete embodiment of the camera shown in FIG. 4.

Referring to FIG. 6, in the one-shot AF mode, the camera provided with the AF and AE control circuit in which an analog spot light measured data at the in-focus detection area is AE-locked, will be first described.

The camera includes an AF sensor 101, for example, a charge-coupled device (CCD) converting a distribution of a quantity of light (an intensity of radiation) at the focus detection sensitivity are 53 in the center of the finder field 51 into an electrical signal, an analog processor and analog-to-digital converter (A/D C) 102 analog-processing the electrically converted distribution of the quantity of light at the AF sensor 101 by a predetermined method and converting the analog-processed signal into a corresponding digital signal, an AF sensor driver 103 energizing the AF sensor 101, and an AF processor 104 detecting a relationship of a distance between a position of the lens unit and a position of the main object and controlling the AF operation in response to the detected relationship. The camera also includes an AF and AE start switch 211 made ON (closed state) at a first push-down step (stage) of a release button (not shown), one end of which is electrically connected to a start terminal $S_1$ in the AE processor 104 and the other end of which is grounded and is electrically connected to a start terminal $SS_1$ of an AE processor 112, described later in detail. The camera further includes a release switch 212 made ON at a second push-down step of the release button, one end of which is electrically connected to a stop terminal $S_2$ of the AF processor 104 and an exposure control start terminal $SS_2$ and the other end of which is grounded. Furthermore, the camera includes an AF mode selection switch 213 made OFF (OPEN state) when the one-shot AF mode is selected, but otherwise, i.e. when the continuous AF mode is selected, is in an ON state. One end of the AF mode selection switch 213 is grounded, and the other end thereof is electrically connected to a selection terminal SE of an multiplexer 110, described later in detail, and an input terminal of an AND gate 303, also described later in detail.

The AF processor 104 is initiated when the start terminal $S_1$ thereof is made low level by turning ON the AF and AE start switch 211, thus energizing the AF sensor 101 through the AF sensor driver 103. In addition, the AF processor 104 judges whether or not the lens unit is in the in-focus position according to an in-focus detection signal S102 output from the analog processor and A/D C 102, making a second output signal line $SL_2$ high level when the in-focus condition is detected, and making a first output signal line $SL_1$ high level when the front-focus condition is detected, or making a third output signal line $SL_3$ high level when the rear-focus condition is detected. The AF processor 104 stops the AF operation when the stop terminal $S_2$ is made low level by turning ON the release switch 212.

The camera includes a motor 107 for moving the lens unit, and a motor driver 105 for controlling the motor 107 and connected to the AF processor 104 through the signal lines $SL_1$ and $SL_3$. The motor driver 105 is made active when a start terminal MS is supplied with a low level signal from a light measurement control circuit 300a. The motor driver 105 activates the motor 107 to move the lens unit from the front-focus position to the in-focus position when the signal level on the signal line $SL_1$ is high level, i.e., the lens unit is in the front focus position. On the other hand, the motor driver 105 activates the motor 107 to move the lens unit from the rear-focus position to the in-focus position when the signal level on the signal line $SL_3$ is high level.

The camera includes an AF display 106 electrically connected to the AF processor 104 and having an in-focus indicator 54, front-focus indicator 55, and rear-focus indicator 56, as shown in FIGS. 1a and 1b and FIGS. 3a and 3b, respectively. The in-focus indicator 54 is illuminated when the AF processor 104 detects that the lens unit is in the in-focus position. The front-focus indicator 55 is illuminated when the AF processor 104 detects that the lens unit is in the front-focus position. The rear focus indicator 56 is illuminated when the AF processor 104 detects that the lens unit is in the rear-focus position. Both the front and rear focus indicators 55 and 56 are lit when the AF processor 104 detects a low contrast condition.

The camera comprises a spot light metering receiving element 201 receiving light from the object at the spot metering area 52 in the finder field 51, an averaged light measurement receiving element 202 receiving light from the object in the whole of the finder field 51, a sample holder 109, and the multiplexer 110. The sample holder 109 samples the spot metering data from the spot light metering receiving element 201 when a control terminal CT thereof is supplied with a low level signal, otherwise, the sample holder 109 holds the sampled data therein. The multiplexer 110 receives the sampled and held spot metering data from the sample holder 109 and the averaged light measurement data from the averaged light measurement receiving element 202, and selectively outputs the spot metering data when the selection terminal SE thereof is supplied with a high level signal, or otherwise, outputs the averaged light measurement data.

The camera includes an A/D C 111, the AE processor 112, an AE display 113, and an exposure controller 114. The A/D C 111 converts an analog signal of either the spot metering data or the averaged light measurement data output from the multiplexer 110 into a corresponding digital signal. The A/D C 111 makes a signal line EOC between the A/D C 111 and the AE processor 112 high level, temporarily, at each completion of an A/D conversion. In other words, the A/D C 111 outputs a single pulse EOC (end-of-conversion) at each completion of the A/D conversion. The AE processor 112 calclates the exposure control data according to the digital converted spot metering data or averaged light metering data, and energizes the AE display 113 displaying the calculated exposure control data, and the exposure controller 114, in response to the calculated exposure control data. More concretely, the AE processor 112 is initiated by the application of a low level signal to the start terminal $SS_1$ thereof due to the turning ON of the AF and AE start switch 211, and starts the exposure control data calculation. In addition, the AE processor 112 starts the energization of the exposure controller 114 by the application of a low level signal to the exposure control drive start terminal $SS_2$ thereof due to the turning ON of the release switch 212.

The camera also includes the light measurement control circuit 300a shown by a dotted line, consisting of a single pulse generator 301, a set-reset type flip-flop (FF) 302, the AND gate 303, an OR gate 304, a pull-up resistor 305, and the AF mode selection switch 213. An input terminal of the pulse generator 301 is electrically connected to a point connected to the start terminal $SS_1$ of the AE processor 104 and one end of the AF and AE start switch 211, and an output terminal thereof is electrically connected to a reset terminal R of the FF 302. The second output signal line $SL_2$, which is made high level and serves as a high enable in-focus signal when the AF processor 104 detects that the lens unit is in the in-focus position, is electrically connected to a set terminal S of the FF 302 and to an input terminal of the OR gate 304 at the other end thereof. An input terminal of the AND gate 303 is connected to a positive output terminal Q of the FF 302, and another input terminal thereof is supplied with a DC power source Vcc supplying a high level signal through the pull-up resistor 305. A common connected point of the resistor 305 and the above other input terminal is connected to the selection terminal SE of the multiplexer 110.

An output terminal of the AND gate 303 is electrically connected to another input terminal of the OR gate 304 and the control terminal CT of the sample holder 109. An output terminal of the OR gate 304 is electrically connected to a start terminal MS of the motor driver 105.

The operation of the circuit shown in FIG. 6 will now be described.

First, the one-shot AF mode will be described for photographing a stationary main object.

Operation sequence 1

The AF mode selection switch 213 is made OPEN, and accordingly, the selection terminal SE of the multiplexer 110 is supplied with a high level signal by the opening of a connection between the selection terminal SE and the DC power source Vcc through the resistor 305. As a result, the multiplexer 109 receives the spot metering data output from the sample holder 109 and outputs the same to the A/D C 111. Simultaneously, another input terminal of the AND gate 303 is supplied with a high level signal by opening a connection between the input terminal and the DC power source Vcc through the resistor 305.

Operation sequence 2

The framing is carried out to place the main object at the focus detection sensitivity area 53 and the spot metering area 52 by viewing the object through the finder field 51.

As the release button is pushed down to the first stage, the AF and AE start switch 211 is closed, and accordingly, the AF processor 104 is initiated by the application of a low level signal to the start terminal $S_1$ thereof. At the same time, the pulse generator 301 is operated and outputs a single pulse to the reset terminal R of the FF 302. The FF 302 is reset and a low level signal is output from the positive output terminal Q. The output terminal of the AND gate 303 is made low level, sending a low level signal to the control terminal CT of the sample holder 109, and accordingly, the sample holder 109 is brought to a sampling mode for sampling the spot metering data output from the spot light metering receiving element 201 therein Normally, in an initial condition, since the lens unit may not be at the in-focus position, the in-focus signal on the signal line $SL_2$ connected to one input terminal of the OR gate 304 is low level and other input terminal of the OR gate 304 is also low level, as set forth above. Consequently, a low level signal is applied to the start terminal MS of the motor driver 105 from the OR gate 304, activating the motor driver 105.

Due to the application of a low level signal to the start terminal $SS_1$ of the AE processor 112 in response to the closing of the AF and AE start switch 211, the AE processor 112 is also initiated.

Operation sequence 3

As the multiplexer 110 is set to output the spot metering data from the sample holder 109, as described above in the operation sequences 1 and 2, the A/D C 111 converts the input spot metering date of an analog form into the corresponding digital value and outputs the same to the AE processor 112 together with a high enable pulse signal EOC on the signal line EOC at the completion of each A/D conversion.

The AE processor 112 receives the digital converted spot metering data, starts the exposure control data calculation on the basis of the received data in response to application of the pulse signal on the line EOC, and energizes the AE display 113 to display the calculated exposure control data thereon. These calculation and display operations are consecutively executed until the release switch 212 is made ON.

As the AF processor 114 is initiated as described above in the operation sequence 2, the AF sensor driver 103 energizes the AF sensor 101 to convert the optical signal of the distribution of the light quantity at the focus detection sensitivity area 53 at the center of the finder field 51 into a corresponding electrical analog signal. The analog processor and A/D C 102 carries out a predetermined analog processing of the electrical converted light quantity distribution, converts the analog processed signal into a digital value, and outputs the same to the AF processor 104. The AF processor 104 judges whether the lens unit is in the front-focus position, the in-focus position, the rear-focus position, or the low contrast condition on the basis of the received light quantity distribution signal and energizes the AF display 106 to illuminate the corresponding indicators 54 to 56. The AF processor 104 makes the first output signal line $SL_1$ high level when the lens unit is in the front-focus position. The motor driver 105, which has already been in operation, drives the motor 107 to move the lens unit to the in-focus position from the front-focus position. The AF processor 104 makes the third output signal line $SL_3$ high level when the lens unit is in the rear-focus position and the motor driver 105 rotates the motor 107 to move the lens unit from the rear focus position to the in-focus position.

Operation sequence 4

As the lens unit is moved and reaches the in-focus position, the AF processor 104 detects this in-focus condition on the basis of the light quantity distribution signal from the AF sensor 101 through the analog processor and A/D C 102, energizes the in-focus indicator 54 in the AF display 106, and makes the second output signal line $SL_2$ high level, i.e., outputs the high enable in-focus signal.

The above in-focus detection method may be substituted by any other known method. For example, the AF processor 104 may count a time required for the movement of the lens unit to the in-focus position.

As the in-focus signal on the signal line $SL_2$ is made high level, the output terminal of the OR gate 304 connected to the start terminal MS is also made high level. As a result, operation of the motor driver 105 is stopped, and thus the lens unit is fixed at the in-focus position.

Simultaneously, the high level in-focus signal on the signal line $SL_2$ is supplied to the set terminal S of the FF 302 to set the FF 302. A high level signal at the positive output terminal Q of the FF 302 is supplied to the input terminal of the AND gate 303, another input terminal of which is supplied with the DC power source Vcc, and a high level signal is output from the AND gate 303. Due to the application of the high level signal to the control terminal CT of the sample holder 109, the sample holder 109 is brought to a hold mode from the sampling mode and holds the latest spot metering data input at the time immediately before the focusing operation, i.e., an AE lock of the spot metering data is achieved.

Operation sequence 5

When the above AE lock of the spot metering data is carried out in response to the detection of the in-focus position of the lens unit, the exposure control data calculated in the AE processor 112 is fixed at the same time.

The completion of the AF operation is confirmed by illuminating the in-focus indicator 54. The user may then create a desired framing by viewing the object through the finder field 51.

The output of the AND gate 303 is kept at the high level so long as the positive output terminal Q of the FF 302 is maintained at a high level. In other words, the output of the AND gate 303 is kept at a high level until the push down operation of the release button is once released to turn OFF the AF and AE start switch 211 and the AF and AE start switch 211 is again turned ON by a push down operation of the release button, activating the pulse generator 301 to output a single pulse to the reset terminal R of the FF 302.

The in-focus signal on the signal line $SL_2$ is made low level, but as long as the positive output terminal Q of the FF 302 is kept at a high level and the output of the AND gate 303 is high level, the motor driver 105 remains at the rest condition.

The spot metering data held in the sample holder 109 may be held until the AF and AE start switch 211 is again made ON.

Under these circumstances, when the release button is pushed down to close the release switch 212, a low level signal is sent to the stop terminal $S_2$ of the AF processor 104 and the exposure control drive start terminal $SS_2$ of the AE processor 112. As a result, the operation of the AF sensor driver 103 is stopped. The AE processor 112 then energizes the exposure controller 114 to release the shutter and take the picture.

Summarizing the above operation, as the one-shot AF mode is chosen for photographing a stationary object the light measurement mode is automatically set to select the spot metering mode as shown in step S12 in FIG. 5. In addition, the fixing of the lens unit at the in-focus position and the AE lock are automatically carried out in response to the in-focus detection at the AF processor 104, as set forth in step S16 in FIG. 5. In other words, the manual operations of steps S02 and S06 in FIG. 2 are eliminated. Furthermore, by making the release switch 212 ON by the push down operation of the release button to the second stage after the desired framing has been created, the exposure control can be carried out on the basis of the data obtained just before the in-focus condition is established.

Next, the continuous AF mode will be described for photographing a moving main object.

Operation sequence 11

The AF mode switch 213 is closed, grounding the selection terminal SE of the multiplexer 110, and the input terminal of the AND gate 303. As a result, the multiplexer 110 is brought to the status in which it can input and output the data of the averaged light measurement receiving element 222. The signal at the output terminal of the OR gate 304 is low level except when the in-focus signal on the signal line $SL_2$ is high level. The start terminal MS of the motor driver 105 is thus supplied with a low level signal. Therefore, the motor driver 105 is operable except when the in-focus signal on the signal line $SL_2$ is high level.

Operation sequence 12

The framing is executed to place the moving main object in the focus detection sensitivity area 53. During the framing, the AF and AE start switch 211 is made ON by the push down operation of the release button to the first stage, initiating the AF processor 104. Simultaneously, the pulse generator 301 outputs a single pulse to the reset terminal R of the FF 302. A low level signal at the output terminal Q of the FF 302 is supplied to the AND gate 303, and a low level signal from the OR gate 304 is supplied to the start terminal MS of the motor driver 105. The motor driver 105 is kept in the active state.

The AE processor 112 is also initiated by application of a low level signal to the start terminal $SS_1$ when the AF and AE start switch 211 is turned ON.

Operation sequence 13

As the averaged light measurement data from the averaged light measurement receiving element 202 is input to the A/D C 111 through the multiplexer 110, the AE processor 112 receives the digital converted averaged light measurement data, calculates the exposure control data on the basis of the same in response to the pulse signal on the EOC line, and activates the AE display 113 by outputting the calculated exposure control data.

The AF processor 104 drives the AF display 106 by outputting the light quantity distribution signal input from the analog processor and A/D C 102 to illuminate the correspondng indicators. The AF processor 104 further outputs the signal on either the signal line $SL_1$ or $SL_3$ to move the lens unit to the in-fouus position through the motor drive 105 and the motor 107.

Operation sequence 14

When the lens unit is moved to the in-focus position, the AF processor 104 detects this status, drives the in-focus indicator 54 on the AF display 106 and outputs the high level in-focus signal on the signal line $SL_2$. A high level signal supplied to the start terminal MS through the OR gate 304 disables the motor driver 105, and the lens unit is fixed at the in-focus position.

In this case, the main object is moving, and accordingly, the above in-focus relationship may be soon eliminated. Accordingly, the AF processor 104 detects the out of focus condition and restores the in-focus signal on the signal line $SL_2$ to a low level, and thus the operation of the motor driver 105 is restarted.

The above stop and restart AF operation may be repeated as shown in FIGS. 7a and 7b. Therefore, even though the in-focus signal on the signal line $SL_2$ becomes high level, and thus the set terminal S of the FF 302 also becomes high level, the light measurement mode is still maintained in the averaged light measurement mode.

Operation sequence 15

While the framing is continued, the stop and restart AF operations are also continued, and the exposure control data at the AE processor 112 is updated.

When the release switch 212 is closed by the push down operation of the release button to the second stage, a low level signal is supplied to the stop terminal $S_2$ of the AF processor 104, stopping the operation of the AF sensor driver 103. The lens unit is fixed at the position at which the release switch 212 is closed, and the shutter is simultaneously released by means of the exposure controller 114. Thus, the picture is taken on the basis of the latest exposure control data.

As can be understood from the above description, the manual operation is reduced, and the moving object is photographed at an optimum mode and the most suitable exposure control. The reduction of the manual operation provides a high speed operation for photography and contributes to an improvement of the performance of the camera.

Figure 8:
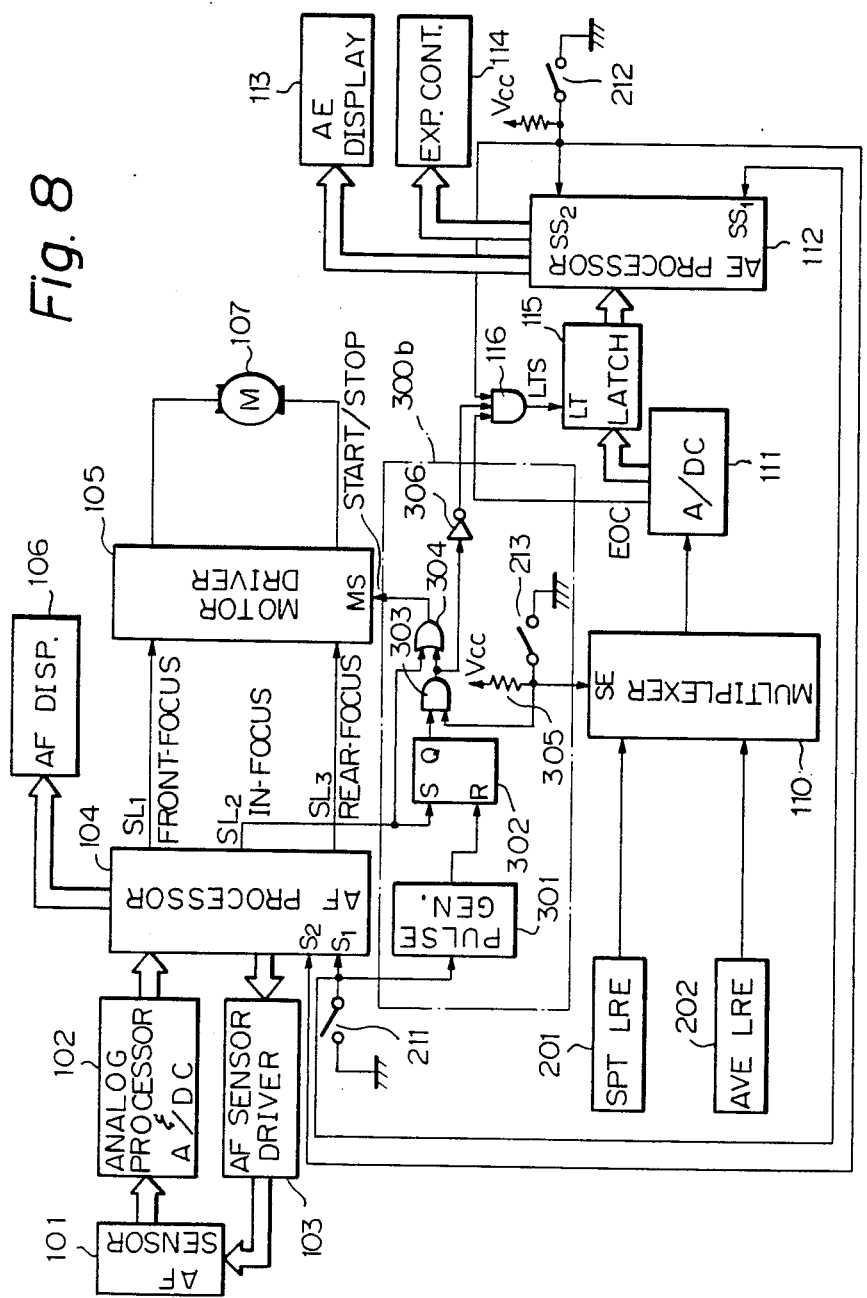
FIG. 8 is another circuit diagram of a second concrete embodiment of the camera in FIG. 4.

Referring to FIG. 8, in the one-shot AF mode, the AE lock with a digital spot metering data will be described, in addition to that described for the camera in FIG. 6.

In FIG. 8, circuit elements bearing the same reference as in FIG. 6 represent the same elements and have substantially the same functions, respectively. Comparing FIG. 8 with FIG. 6, in FIG. 8, the sample holder 109 is omitted, a latch circuit 115 is additionally provided between the A/D C 111 and the AE processor 112, an AND gate 116 having three input terminals and an output terminal thereof connected to a latch terminal LT of the latch circuit 115 is added, and an inverter 306 in a light measurement control circuit 300b is provided between the AND gate 303 and the AND gate 116. The input terminals of the AND gate 116 are connected to the release switch 212, the inverter 306, and the EOC line, on which the EOC pulse signal is made high level in a pulse form upon completion of every A/D conversion at the A/D C 111. The latch circuit 115 receives the A/D converted light measurement data and latches the same upon receiving a high level latch signal LTS at the latch terminal LT thereof.

First, the one-shot AF mode will be described for photographing a stationary main object.

When the AF mode selection switch 213 is opened, the multiplexer 110 operatively connects the spot metering light receiving element 201 to the A/D C 111. When the AF and AE start switch 211 is made ON, the AF processor 104 becomes operative and outputs the low level in-focus signal on the signal line $SL_2$ if the lens unit is not in the in-focus position. The FF 302 remains reset. A low level signal is supplied to the AND gate 303, and the low level signal at the AND gate 303 is inverted to a high level at the inverter 306, and this high level signal is supplied to the second input terminal of the AND gate 116. The first input terminal of the AND gate 116 is also supplied with a high level signal because the release switch 212 is open. Upon completion of the conversion at the A/D C 111 of the spot metering data from an analog form into a digital signal, the high level single pulse EOC is supplied to the third input terminal of the AND gate 116 through the line EOC. The high level single pulse LTS is output to the latch terminal LT of the latch circuit 115 from the AND gate 116, and the latch circuit 115 latches the latest updated digital converted spot metering data and sends the same to the AE processor 112. This updating and latching of the spot metering data is repeated until the release switch 222 is closed.

When the lens unit is in the in-focus position, the AF processor 104 energizes the signal line $SL_2$ at a high level, setting the FF 302. High level signals are input to the AND gate 303 from the FF 302 and the DC power source Vcc through the resistor 305, since the AF mode selection switch 213 is kept open, and the AND gate 303 then outputs a high level signal. The second input terminal of the AND gate 116 is supplied with a low level signal from the inverter 306, and thus a low level signal LTS is supplied to the latch terminal LT of the latch circuit 115. As a result, updating of the spot metering data in the latch circuit 115 is inhibited. Therefore, the AE lock of the spot metering data is carried out in response to the detection of the in-focus position of the lens unit.

The release switch 212 is turned ON, and subsequently, the AE processor 112 calculates the exposure control data and energizes the exposure controller 114 by outputting the data.

Other operations are similar to those set forth above with reference to FIG. 6, and thus are omitted.

The continuous AF mode will now be described.

When the AF mode switch 213 is made ON, the averaged light measurement receiving element 202 is operatively connected to the A/D C 111 through the multiplexer 110.

The AND gate 303 outputs a low level signal, and accordingly, a high level signal is supplied to the second input terminal of the AND gate 116 through the inverter 306. The first input terminal of the AND gate 116 is also supplied with the DC power source Vcc since the release switch 212 is kept open. Upon completion of every conversion of the A/D C 111 and supply of the conversion completion pulse signal to the third input terminal of the AND gate 116 through the EOC line, the averaged light measurement data converted into a digital value at the A/D C 111 is latched at the latch circuit 115 and the latched data is supplied to the AE processor 112. In this way, the latch circuit 115 carries out the updating and latching of the averaged light measurement data at every completion of the A/D conversion.

The output of the AND gate 303 is kept at a low level even when the in-focus signal on the signal line $SL_2$ is changed to a high level by the detection at the AF processor 104 that the lens unit is in the in-focus position. Accordingly, the updating and latching of the averaged light measurement data is repeated upon the generation of the A/D conversion completion pulse signal from the A/D C 111. During these operations, the lens unit will approach and retreat from the in-fous position, and vice versa, repeatedly, as shown in FIGS. 7a and 7b.

When the release switch 212 is closed, a low level signal is supplied to the first input terminal of the AND gate 116. The AND gate 116 outputs the low level signal LTS to the latch terminal LT of the latch circuit 115, although the other second and third input terminals are supplied with high level signals, and thus the updating of the averaged light measurement data in the latch circuit 115 is inhibited. The latest averaged light measurement data latched at a time just before the release switch 212 is closed is provided for calculating the exposure control data in the AE processor 112.

Other operations are similar to those set forth above with reference to FIG. 6.

Figure 9:
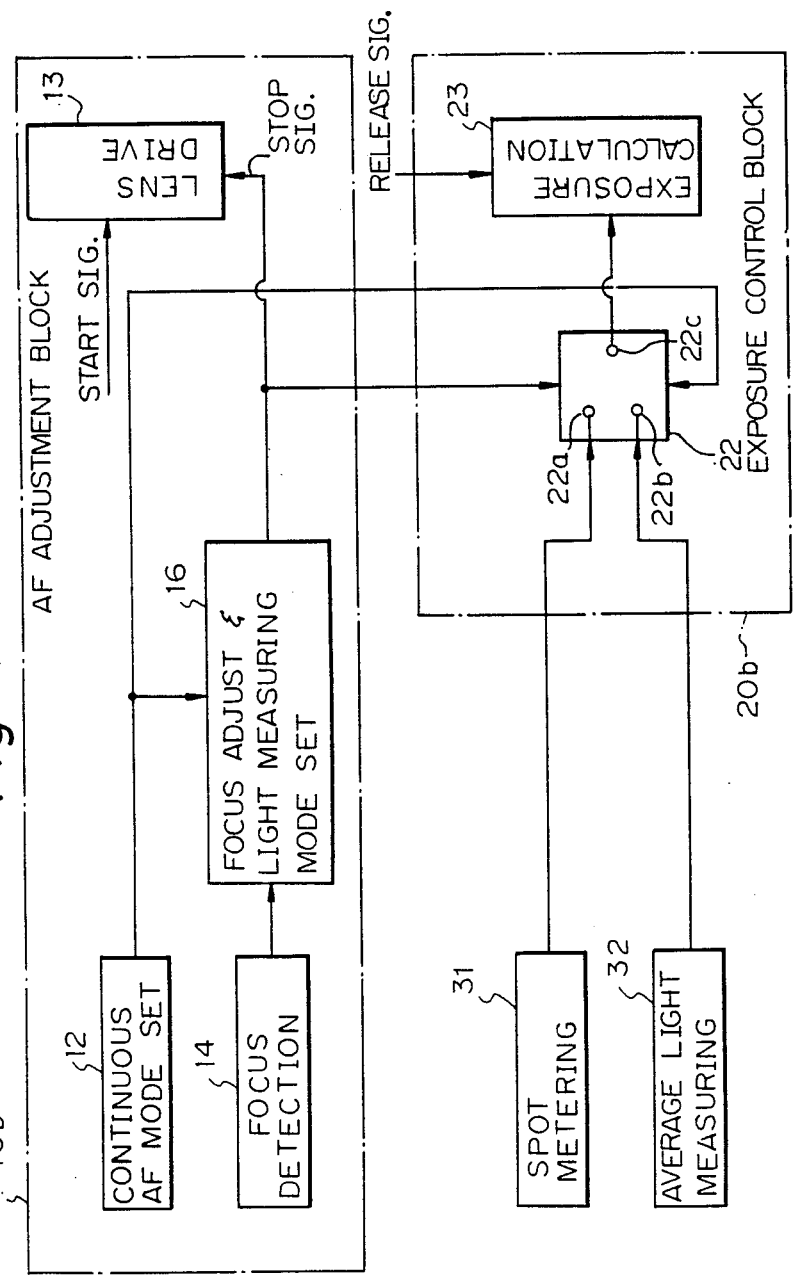
FIG. 9 is a block diagram of a second conceptual embodiment of a camera including the AF and AE control means in accordance with the present invention.

Referring to FIG. 9, a second conceptual embodiment of a camera in which the exposure operation for photographing moving objects is improved, according to the present invention, will be described.

The camera includes an AF and AE control means consisting of an AF adjustment block 10b, an AE control block 20b, a spot metering unit 31, an averaged light measuring unit 32, a lens system (not shown), a lens drive unit and a mechanism. The AF adjustment block 10b includes a continuous AF mode setting unit 12, a lens drive unit 13, a focus detection unit 14, and a unit 16 for stopping the focus adjustment and setting the light measuring mode.

The AE control block 20b includes a switching unit 22 and an exposure calculation unit 23.

Components bearing the same reference as those in FIG. 4 represent the same components and have substantially the same functions, respectively. The construction in FIG. 9 is a simplified version of that shown in FIG. 4. In this embodiment, the unit 16 differs from the unit 15. Namely, the unit 16 sends a switchover signal to the switching unit 22 when the in-focus signal is applied thereto from the focus detection unit 14 in the continuous AF mode, and outputs a stop signal to the lens drive unit 13.

The operation of the camera shown in FIG. 9 will be briefly described.

The continuous AF mode set unit 12 is activated to photograph a moving object. The switching unit 22 is energized to operatively connect between the averaged light measuring unit 32 and the exposure calculation unit 23. Simultaneously, the focus adjustment and light measurement mode setting unit 16 is made operative. The framing has been effected by tracking the moving object in the finder field 51. When the AF and AE start signal is supplied to the lens drive unit 13, the lens unit is moved to the in-focus position. When the lens unit is in the in-focus position, the stop signal is supplied to the lens drive unit 13 from the unit 16, and the switchover signal is also supplied to the switching unit 22, to change the connection between the averaged light measuring unit 32 and the exposure calculation unit 23 to the connection between the spot metering unit 31 and the exposure calculation unit 23. The lens unit is then fixed at that position.

If the lens unit moves away from the in-focus position due to movement of the object, the in-focus signal is changed to a disabled state, and the AF operation is restarted. The connection between the averaged light measuring unit 32 and the exposure calculation unit 23 is then restored.

The above operations are repeated as shown in FIG. 10a to 10c. When the release signal is supplied to the exposure calculation unit 23, the exposure control is effected on the basis of either the averaged light measuring data if the lens unit is not in the in-focus position, or on the basis of the spot metering data. This provides a preferable exposure control.

A more specific description of the second embodiment set forth above with reference to FIG. 9 will be given with reference to FIGS. 11 to 13.

FIG. 11 is a circuit diagram of the AF and AE means in which the spot metering data is AE-latched as an analog value in the one-shot AF mode. The circuit in FIG. 11 includes an OR gate 307 in a light measurement control ciruuit 300c, in addition to the light measurement control circuit 300a in FIG. 6. Other circuit elements bearing the same references as those in FIG. 6 are substantially identical to those in FIG. 6.

The OR gate 307 has input terminals connected to the signal line SL2, on which the in-focus signal is made high level when the lens unit is in the in-focus position, and to the AF mode selection switch 213, and an output terminal connected to the selection terminal SE of the multiplexer 110.

First, the one-shot AF mode will be described.

The operation sequences 1 through 5 described before may be basically applied thereto, except that additional operations, in particular, the selection of the light measuring data at the multiplexer 110 by the in-focus signal on the line SL2, due to the provision of the OR gate 307 are added.

In an initial condition, since the AF processor 104 is not operative, the in-focus signal on the signal line SL2 is low level. When the AF mode selection switch 213 is made open, a high level signal is supplied to the selection terminal SE of the multiplexer 110 through the OR gate 307, operatively connecting the sample holder 109 and the A/D C 111.

The framing is effected, and when the AF and AE start switch 212 is closed, the AF processor 104 starts the AF operation. The control terminal CT of the sample holder 109 is supplied with a low level signal through the AF and AE start switch 212, the pulse generator 301, the FF 302, and the AND gate 303, and thus the sample holder 109 is made being operative in the sampling mode. The AE processor 112 also starts the exposure control data calculation.

The AF operation is effected and the exposure calculation is also continued on the basis of the spot metering data. When the lens unit reaches the in-focused position, the in-focus signal on the signal line $SL_2$ stops the operation of the motor driver 105 through the OR gate 304. The in-focus signal also changes the mode of the sample holder 109 to the hold mode by applying a high level signal to the control signal CT through the FF 302 and the AND gate 303. Accordingly, the AE-latching of the spot metering data is realized and the output of the OR gate 307 is kept at a high level, and thus the status in the multiplexer 110 is not changed.

The provision of the OR gate 307 does not affect the operations in the operation sequences 1 through 5.

The continuous AF mode will now be described, and the operation sequences 11 through 15 may be basically applied thereto.

In an initial condition, the in-focus signal on the signal line $SL_2$ is low level. When the AF mode selection switch 213 is closed, the output of the OR gate 307 is made low level. The multiplexer 110 then makes the connection between the averaged light measuring receiving element 202 and the A/D C 111. The motor driver 105 starts to drive the lens unit through the motor 107 by supplying a low level signal at the start terminal MS thereof.

The framing is effected, and when the AF and AE start switch 211 is closed, the AF processor 104 starts the AF operation. The FF 302 is then reset and the motor driver 105 continues to drive the lens unit. The AE processor 112 then starts the exposure control data calculation on the basis of the averaged light measuring data.

When the lens unit reaches the in-focus position, the high level in-focus signal stops the operation of the motor driver 105 through the OR gate 304, fixing the lens unit at the in-focus position. The in-focus signal changes the selection mode in the multiplexer 110 through the OR gate 307 to operatively connect the sample holder 109 and the A/D C 111.

Since the main object is a moving object, the above in-focus status may be easily destroyed during the framing. Accordingly, the above AF operation and the lens locking operation are repeated as shown in FIGS. 10a and 10b. When the release switch 212 is turned ON, the AE processor 112 uses the latest data of either the spot metering data in the in-focus condition or the averaged light measuring date in the out of focus condition, as shown in FIG. 10c, for calculating the exposure control value.

Figure 12:
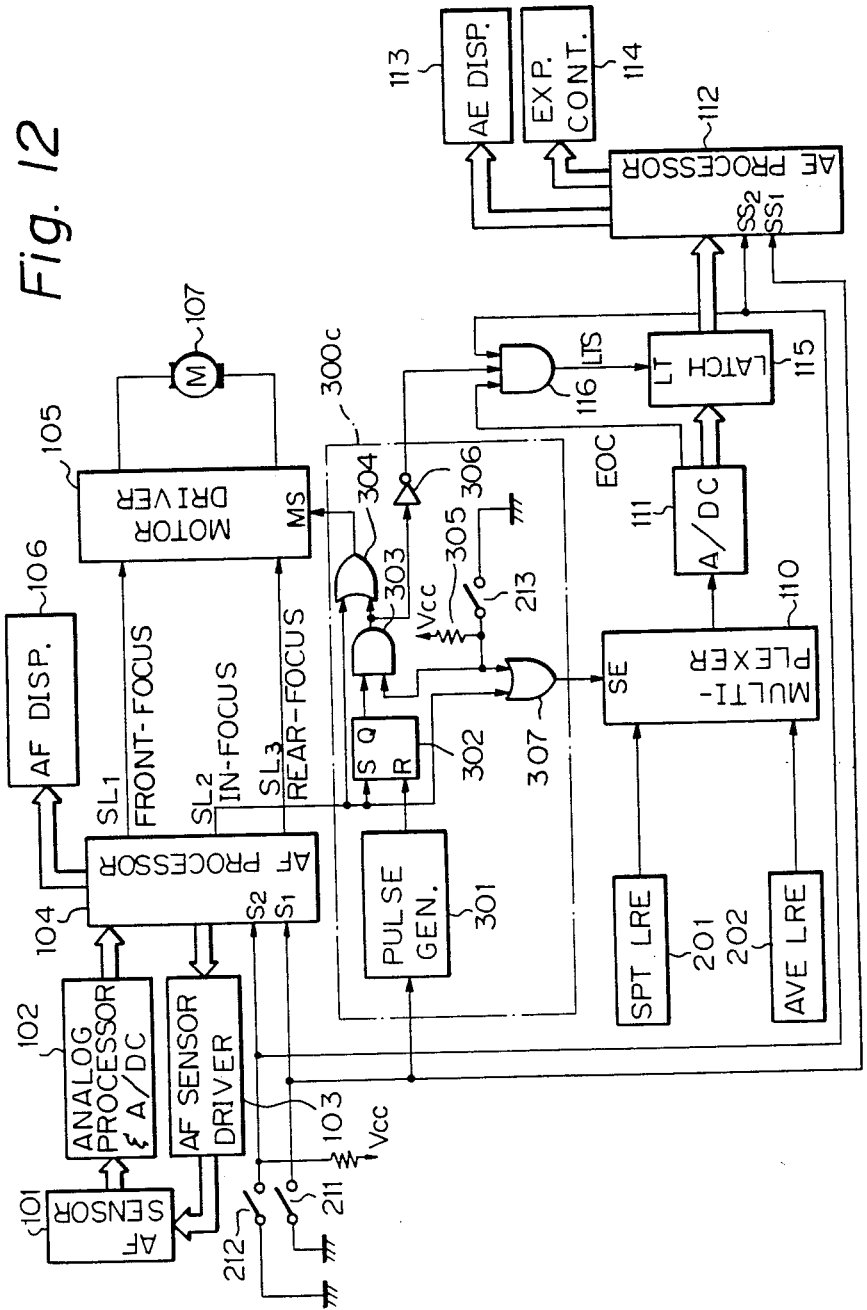

FIG. 12 is a circuit diagram of the AF and AE means in which the spot metering data is AE-latched as a digital value in the one-shot AF mode. As seen from FIG. 12, the light measurement control circuit 300c is identical to that in FIG. 11. In other words, the OR gate 307 is provided in addition to the light measurement control circuit 300b shown in FIG. 8.

As described above with reference to FIG. 11, the provision of the OR gate 307 does not affect the operation in the one-shot AF mode. The above operation set forth above with reference to FIG. 8 may be executed in the one-shot AF mode in this case.

In the continuous AF mode, the basic operation set forth above with reference to FIG. 11 is applied to this circuit, except that the data using the calculation for the exposure control is once latched at the latch circuit 115, as mentioned above with reference to FIG. 8.

FIG. 13 is a circuit diagram of a modification of the circuit shown in FIG. 11.

In the circuit shown in FIG. 11, during the continuous AF mode operation, the distance between the camera, specifically the lens unit, and the moving object may fluctuate even though the moving object is once placed in the focus detection sensitive area 53 in the finder field 51 in a period of in-focus detection, and consequently, a small out-of-focus value may result due to a time lag Ts between the lens focusing and the detection thereof, as shown in FIGS. 14a and 14b. This condition for the time Ts is called a semi in-focus condition in the specification. In the semi in-focus condition, the AF operation is effected, but the averaged light measuring data is used for calculation of the exposure control, although the moving object is in the spot metering area 52.

In order to eliminate the above defect, the AE processor 104 judges the semi in-focus condition and outputs a semi in-focus signal on an output signal line $SL_4$. The semi in-focus signal is supplied to the selection terminal SE of the multiplexer 110 through an OR gate 308 in a light measurement control circuit 300d.

In the continuous AF mode, the AF processor 104 detects the semi in-focus condition and a high level semi in-focus signal is supplied to the multiplexer 110 in the same way as the in-focus signal on the line $SL_2$ connected to the OR gate 308, selecting the spot metering data as the light measurement data. Thus avoiding the above defect.

The above defect may occur in the circuit shown in FIG. 12, and accordingly, the countermeasure in FIG. 13 may be adopted in the circuit in FIG. 12.

Figure 15:
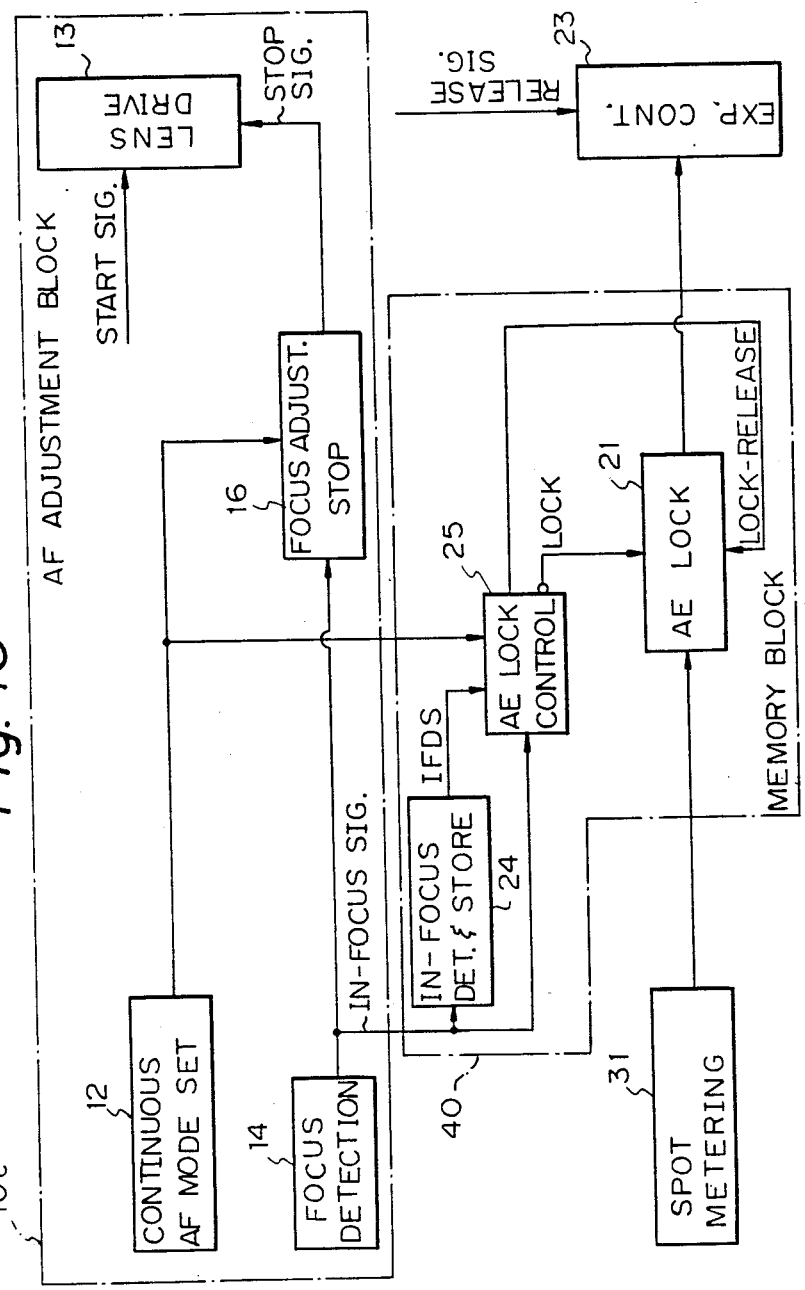
FIG. 15 is a block diagram of a third conceptual embodiment of a camera having the AF and AE control means in accordance with the present invention.

Referring to FIG. 15, a third conceptual embodiment of a camera in which the exposure control and the operability are further improved, according to the present invention, will be described.

The camera includes an AF and AE means consisting of an AF adjustment block 10c, a memory block 40, a spot metering unit 31, and an exposure control unit 23. The AF adjustment block 10c includes a continuous AF mode setting unit 12, a focus detection unit 14, a lens drive unit 13, and a focus adjustment stop unit 16. The memory block 40 includes the AE lock unit 21, an in-focus detection and store unit 24, and an AE lock control unit 25. The spot metering unit 31 and the exposure controller 23 are substantially identical to those in FIG. 4. Other components bearing the same references as those in FIGS. 4 and 9 have substantially the same functions.

The in-focus detection and store unit 24 stores the data of the detection of the in-focus condition when the in-focus signal is received thereat. In the continuous AF mode, the AE lock control unit 25 outputs a lock-release signal to AE lock unit 21 when an in-focus detection and store signal from the in-focus detection and store unit 24 is received, otherwise, it outputs a lock (latch) signal. The AE lock unit 21 receives and stores the spot metering data, and outputs the same to the exposure control unit 23. The AE lock unit 21 holds the received spot metering data in response to the lock signal from the AE lock control unit 25, and updates the received spot metering data in response to the lock-release signal.

The operation will now be briefly described.

The continuous AF mode setting unit 12 is first activated to photograph the moving object. The framing is effected by tracking the moving object in the focus detection sensitive area 53, and the AF operation is initiated. When the lens unit is not in the in-focus position, the in-focus detection and store unit 24 does not output the in-focus detection and store signal IFDS in the enable state to the AE lock control unit 25, and accordingly, the AE lock control unit 25 does not output the lock signal to the AE lock unit 21. The AE lock unit 25 receives and stores the spot metering data and outputs the same to the exposure control unit 23. On the other hand, when the lens unit once reaches the in-focus position, the AE lock cnntrol unit 25 outputs the lock-release signal and the AE lock unit 21 continues the above updating operation. The focus adjustment stop unit 16 outputs the high level stop signal to the lens drive unit 13, fixing the lens unit at that position.

In response to the motion of the moving object, an out of focus state of the lens unit will exist as shown in FIG. 16a. The AE lock control unit 25 then outputs the lock signal, latching the in-focus spot metering data received immediately before the lens unit moved out of the in-focus position, in the AE lock unit 21. The lens drive unit 13 is then restarted. When the lens unit again reaches the-focus position, the AE lock control unit 25 outputs the lock-release signal to restart the updating of the spot metering data in the AE lock unit 21. The lens drive unit 13 is naturally stopped.

The above operation is consecutively effected until the release switch is applied to the exposure control unit 23 as shown in FIGS. 16a to 16c. The exposure control unit 23 uses the latest spot metering data to control the exposure.

This embodiment will also give an improved operation and good exposure.

More concrete embodiments of the camera described with reference to FIG. 12 will be disclosed with reference to FIGS. 17 to 24.

Figure 17:
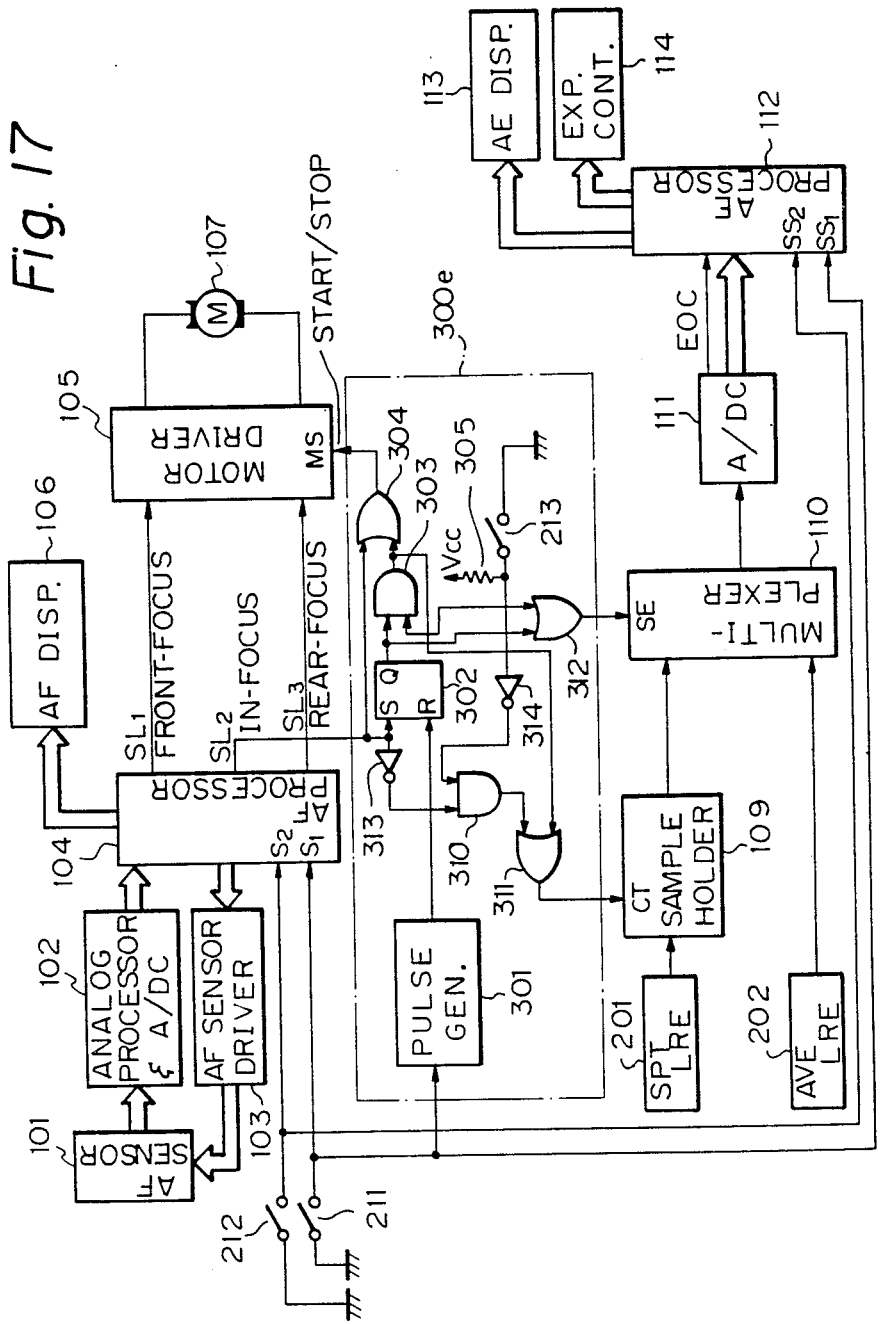
FIGS. 17 and 18 are circuit diagrams of first and second specific embodiments of the circuit shown in FIG. 15.

FIG. 17 represents a camera with the AF and AE means in which the spot metering data is AE-locked as an analog data when the lens unit is moved to the in-focus position, in the one-shot AF mode.

In FIG. 17, a light measurement control circuit 300e is provided with an AND gate 310, OR gates 311 and 312, and inverters 313 and 314, in addition to the ligt measurement control circuit 300a in FIG. 6. Other circuit elemenss are the same as in FIG. 6 and have substantially identical functions.

The operation will be described in the one-shot AF mode for photographing a stationary main object.

When the AF mode selection switch 213 is opened, a high level Vcc signal is supplied to the selection terminal SE of the multiplexer 110 through the OR gate 312, and the spot metering data is applied to the A/D C 111 through the multiplexer 110. The high level signal is also supplied to an input terminal of the AND gate 303 and the inverter 314. A low level signal from the inverter 314 is supplied to an input terminal of the AND gate 310, and accordingly, an output thereof is kept at a low level in the one-shot AF mode.

The framing is effected, and when the AF and AE start switch 211 is made ON (close), the AF processor 104 starts the AF operation. The FF 302 is reset by applying a single pulse from the pulse generator 301 at the reset terminal. A low level start enable signal is sent to the lens driver 105, energizing the lens driver 105 and the motor 107. The AE processor 112 is also initiated. The AE processor 112 calculates the exposure control data on the basis of the digital converted spot metering data upon every EOC signal supplied thereto.

When the lens unit raaches the in-focus position, a high level in-focus signal on the signal line SL$_2$ stops the drive of the motor 107 through the OR gate 304 and the motor driver 105. The high level in-focus signal sets the FF 302, and sends a high level signal to the control terminal CT of the sample holder 109 through the AND gate 303 and the OR gate 311, changing the sample holder 109 from the sampling mode to the holding mode, and thus, AE-locking the spot metering data.

The exposure control data is calculated on the basis of the latched spot metering data. The framing is again effected, and when the release switch 212 is made ON (closed), the picture is taken.

As described above, the additional circuit elements 310 to 314 do not affect the one-shot AF mode operation.

The operation will be described in the continuous AF mode for photographing a moving main object.

The AF mode switch 213 is made ON (closed), and a low level signal is supplied to the AND gate 303, the inverter 314 and the OR gate 312. In an initial condition, the FF 302 is reset, and supplies a low level signal to the selection terminal SE of the multiplexer 110 through the OR gate 312, selecting the averaged light measuring data. A low level signal is then supplied to the lens driver 105, to drive the lens unit.

When the AF and AE start switch 211 is turned ON, the AF processor 104 starts the AF operation together with the lens driver 105 and the motor 107. As the lens unit is not in the in-focus position, a low level in-focus signal is supplied to the inverter 313, and a high level signal is supplied to the control terminal CT of the sample holder 109, and accordingly, the sampling mode is set. The AE processor 112 is then operative.

Unless the lens unit is in the in-focus position, the AE processor 112 calculates th exposure control data on the basis of the digital converted averaged light measuring data. When the lens unit reaches the in-focus position, the lens motion is stopped and the FF 302 is set, sending a high level signal to the selection terminal SE through the OR gate 312, and changing the selection of the light measurement data to the spot metering data through the sample holder 109. The sample holder 109 is also supplied with a high level signal at the control terminal CT, and changes the holding mode to the sampling mode.

Since the main object is moving, the above in-focus condition may be soon destroyed. Accordingly, the above AF operation and data latching operations can be consecutively executed, as shown in FIGS. 16a to 16c.

When the release switch 212 is closed, the AE processor 112 uses the latest light measuring data, either the averaged light measuring data or the sampled spot metering data, on the basis of whether or not the lens unit is out of focus. The exposure control is achieved according to the latest light measuring data.

Figure 18:
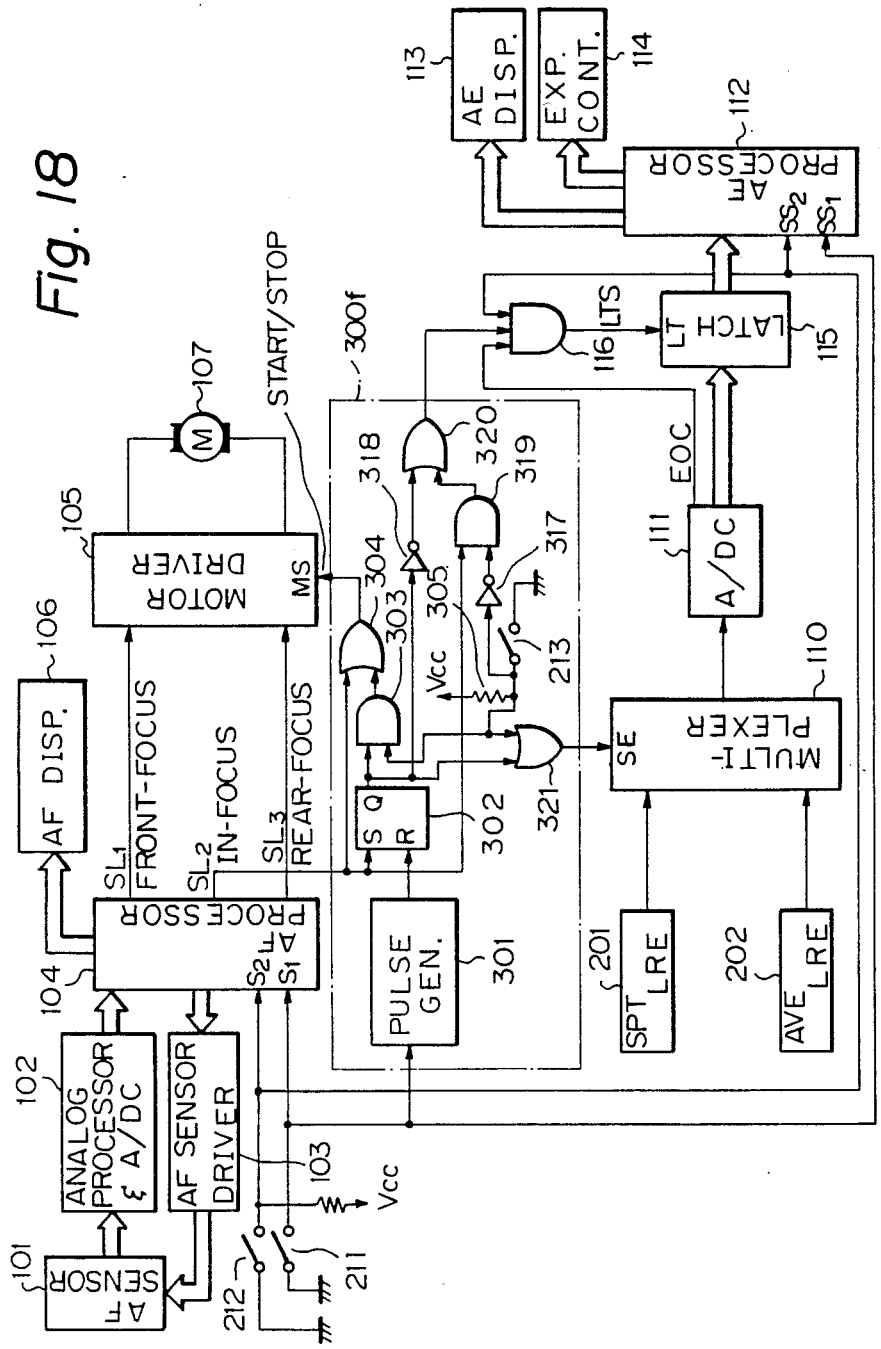
Figure 19:
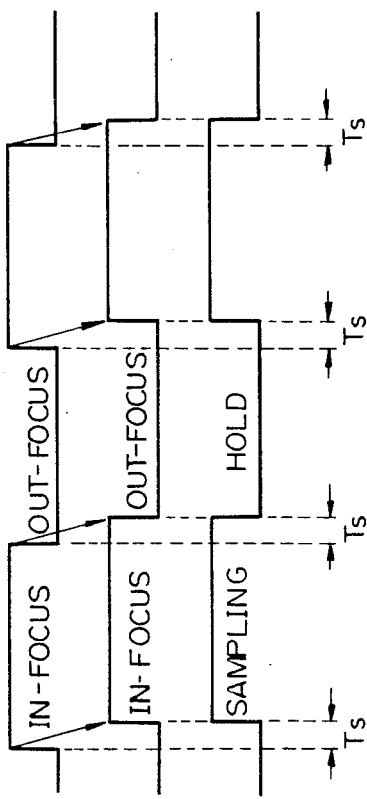
FIGS. 19a, 19b, and 19c are timing charts showing the operation of the circuits shown in FIGS. 17 and 18.

FIG. 18 represents a camera with the AF and AE control means in which the spot metering data is AE-locked as digital data when the lens unit reaches the in-focus position, in the one shot AF mode.

In FIG. 18, a light measurement control circuit 300f is provided with inverters 317 and 318, an AND gate 319 and OR gates 320 and 321, in addition to that 300b in FIG. 8. The light measurement control circuit 300f is provided with the inverter 317, the AND gate 319, and the OR gate 320 in that 300c in FIG. 10. The inverter 318 is substantially identical to the inverter 306. The input connection of the OR gate 321 differs from that of the OR gate 307 in FIG. 12, but the function thereof is substantially identical to that in FIG. 17.

Other circuit elements and connections are substantially identical to those in FIGS. 8, 12, and 17.

In the one-shot AF mode by which the AF mode selection switch 213 is made OFF (open), the operations are substantially identical to those in the aforementioned concrete embodiments with reference to FIGS. 8 and 12, because a constant high level signal from the power source Vcc through the resistor 305 and the OR gate 321 is supplied to the selection terminal SE of the multiplexer 110. Therefore, the description of the operations in question is omitted.

In the continuous AF mode by which the AF mode selection switch 213 is made ON (closed), a low level signal is supplied to the selection terminal SE of the multiplexer 110 in an initial condition, selecting the averaged light measuring data for calculating the exposure control data in the AE processor 112.

When the AF and AE start switch 211 is closed, a low level enable signal sent through the switch 211 initiates the AF processor 104, AE processor 112 and the single pulse generator 301. The AF operation is then started, and the FF 302 is reset. Before the release switch 212 is turned ON, a high level enable signal is supplied to the first input terminal of the AND gate 116. A high enable signal passed through the output terminal of the FF 302 at a low level is output by the inverter 318 at a high level to the OR gate 320 and is also supplied to the second input terminal of the AND gate 116. The latch circuit 115 latches the A/D converted averaged light measurement data at every completion of the A/D conversion by applying a high level enable pulse on the EOC line to the third input terminal of the AND gate 116. The AE processor 112 uses the latched light measurement data for calculating the exposure control data.

When the lens unit reaches the in-focus position, the high level enable in-focus signal on the signal line SL$_2$ sets the FF 302. A high level signal at the output terminal Q of the FF 302 changes the output data selection in the multiplexer 110 to output the spot metering data instead of the averaged light measuring data. The output of the inverter 318 is changed to low level, but the AND gate 319 provides a high level signal to the OR gate 320. Accordingly, the operation of the latch circuit 115 is continued.

The output selection is altered in response to the in-focus condition or the out-of-focus condition of the lens unit.

When the release switch 212 is closed, the latching in the latch circuit 115 is stopped, and the exposure is controlled according to the latest latched data.

In the above concrete embodiments, the defect due to the time lag Ts between the actual lens focusing and the detection thereof, as shown in FIGS. 19a and 19b similar to FIGS. 14a and 14b, may occur. As a result, for the time lag Ts, an insufficient light measuring data may be used for calculating the exposure control data.

Figure 20:
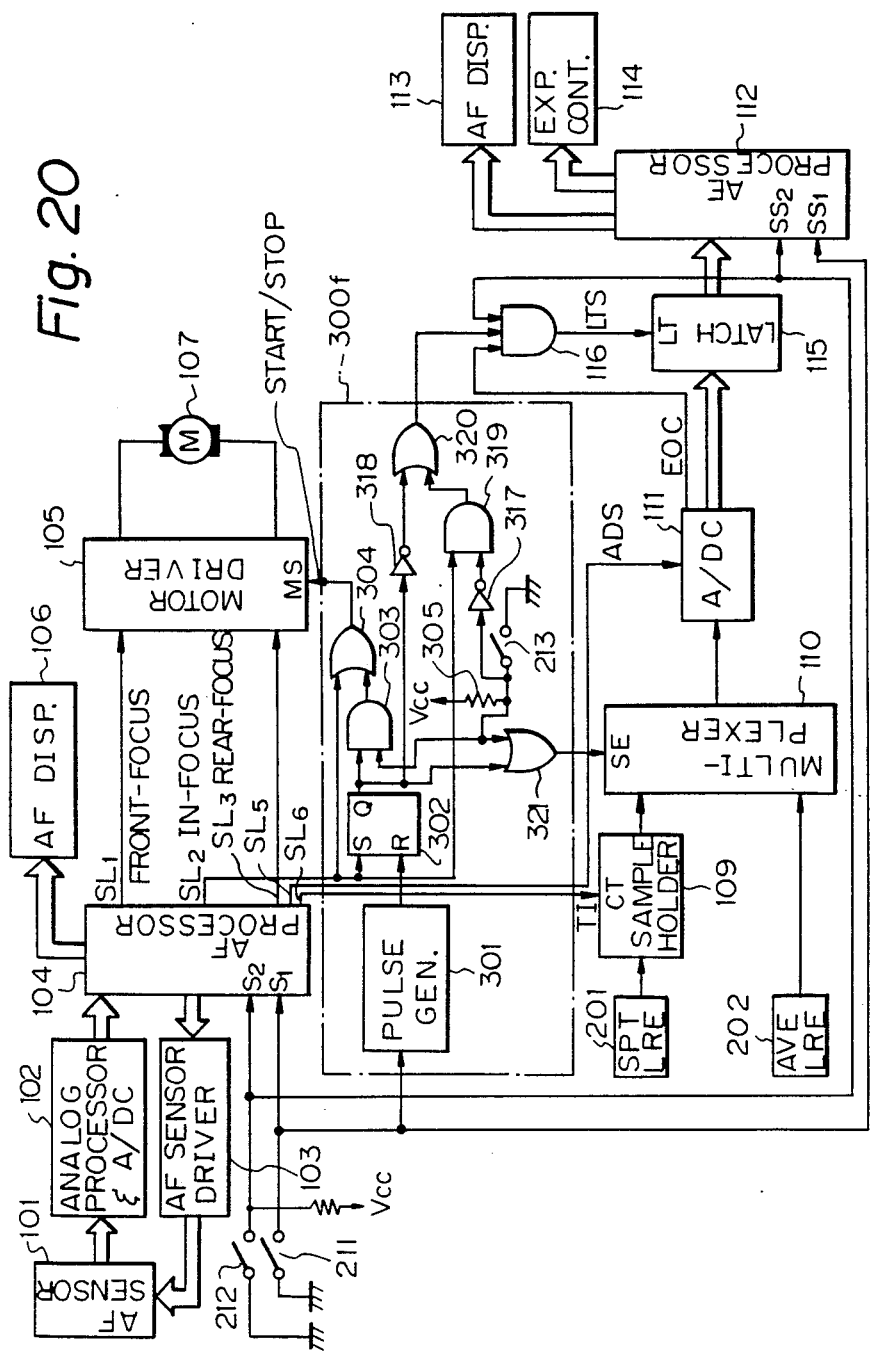
FIG. 20 is a circuit diagram of a third specific embodiment of the circuit shown in FIG. 15.
Figure 21:
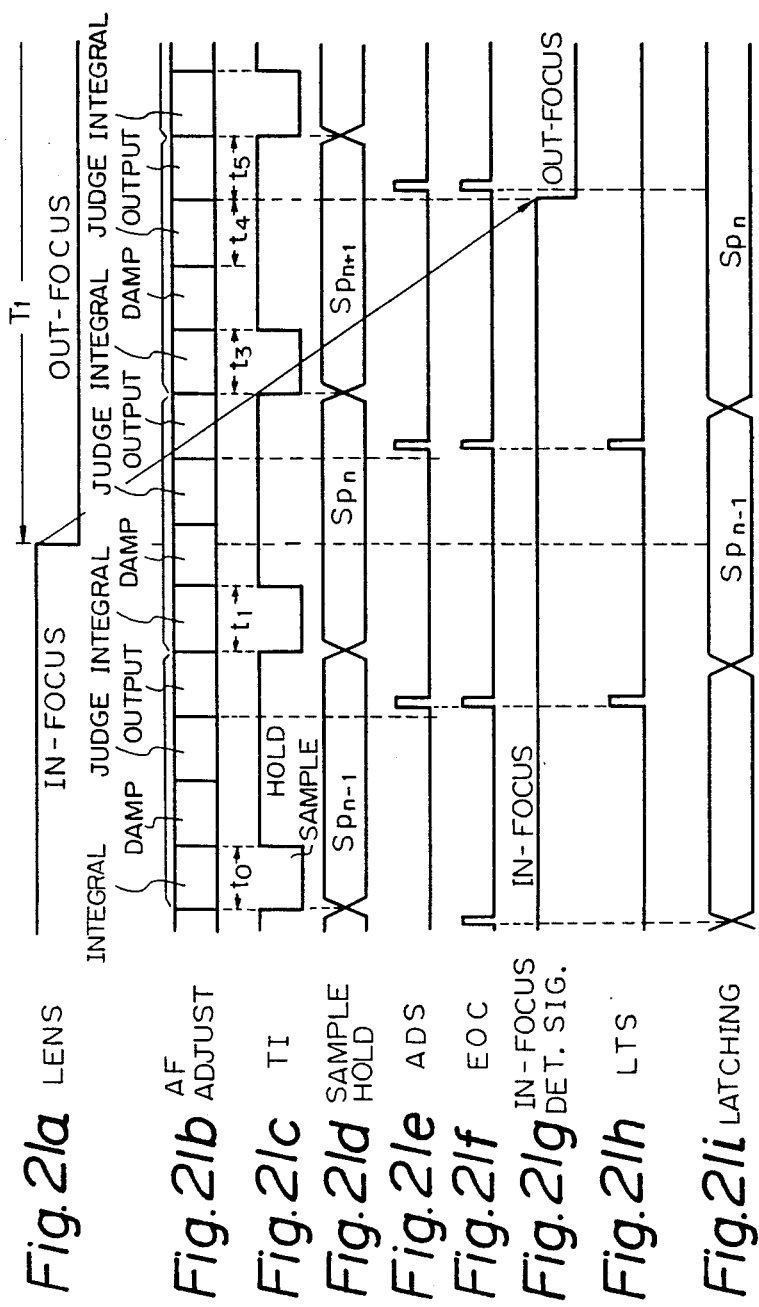
FIGS. 21a to 21i are timing charts showing the operation of the circuit in FIG. 20.

FIG. 20 represents a modified version of the circuit shown in FIG. 18, eliminating the above defects.

The circuit shown in FIG. 20 is provided with the sample holder 109 between the spot metering receiving element 201 and the multiplexer 110. The AF processor 104 outputs an integral signal TI having a low level while the AF sensor 101 integrates the incident light, to the control terminal CT of the sample holder 109, as shown in FIG. 21c. The AF processor 104 also outputs an analog to digital conversion signal ADS of a high level pulse enable signal for starting the A/D conversion after the completion of the judgement of whether the lens unit is in the in-focus condition and before the integration operation, as shown in FIG. 21e.

The operation will be described with reference to FIG. 21a to 21i.

The continuous AF mode is selected by turning ON (close) the AF mode selection switch 213. The AF and AE start switch 212 is turned ON, and the lens unit is once moved to the in-focus position and away from the in-focus position. The sampled spot metering data SPn in FIG. 21d at a time when the state is changed to the out-of-focus state is integrated for an integral time $t_1$. The spot metering data SPn is latched. The latch circuit 115 had latched a previous spot metering data SPn−1 sampled at an integral time $t_0$, and updates the data latching on the data SPn when the pulse signal EOC (FIG. 21f) is supplied to the AND gate 116 and the latch signal LTS (FIG. 21h) is supplied to the latch circuit 115.

It is supposed that the spot metering data SPn+1 is sampled for a first integration time $t_3$ when the lens unit moves away from the in-focus position. The AF processor 104 detects the out-of-focus condition of the lens unit at a time $t_4$ and outputs either the front-focus signal or the rear-focus signal at a time $t_5$. Accordingly, the in-focus signal on the signal line $SL_2$ is not output, and the low level latch signal LTS is output to the latch circuit 115. The updating of the latching of the spot metering data is inhibited, and the spot metering data SPn is still latched.

When the release switch 212 is closed for a time between the change of the lens condition from the in-focus state to the out-of-focus state, and the output of the EOC signal indicating the completion of the A/D conversion, the exposure control is achieved on the basis of the latched spot metering data SPn−1 obtained in the in-focus condition. On the other hand, when the release switch 212 is closed for a time between the completion of the A/D conversion and the output of the out-of-focus detection signal, the exposure control is achieved on the basis of the spot metering data SPn latched for the time $t_5$. This realizes an optimum exposure control.

Two sample holders or two latch circuits may be used instead of the sample holder 109 and the latch circuit 115.

In the embodiments described with reference to FIGS. 17 and 20, in the continuous AF mode, the averaged light measuring data is supplied to the AE processor 112 until a first in-focus condition is detected. The spot metering data is supplied to tee AE processor 112 for the above time. The following embodiments disclose this type of circuit.

Figure 22:
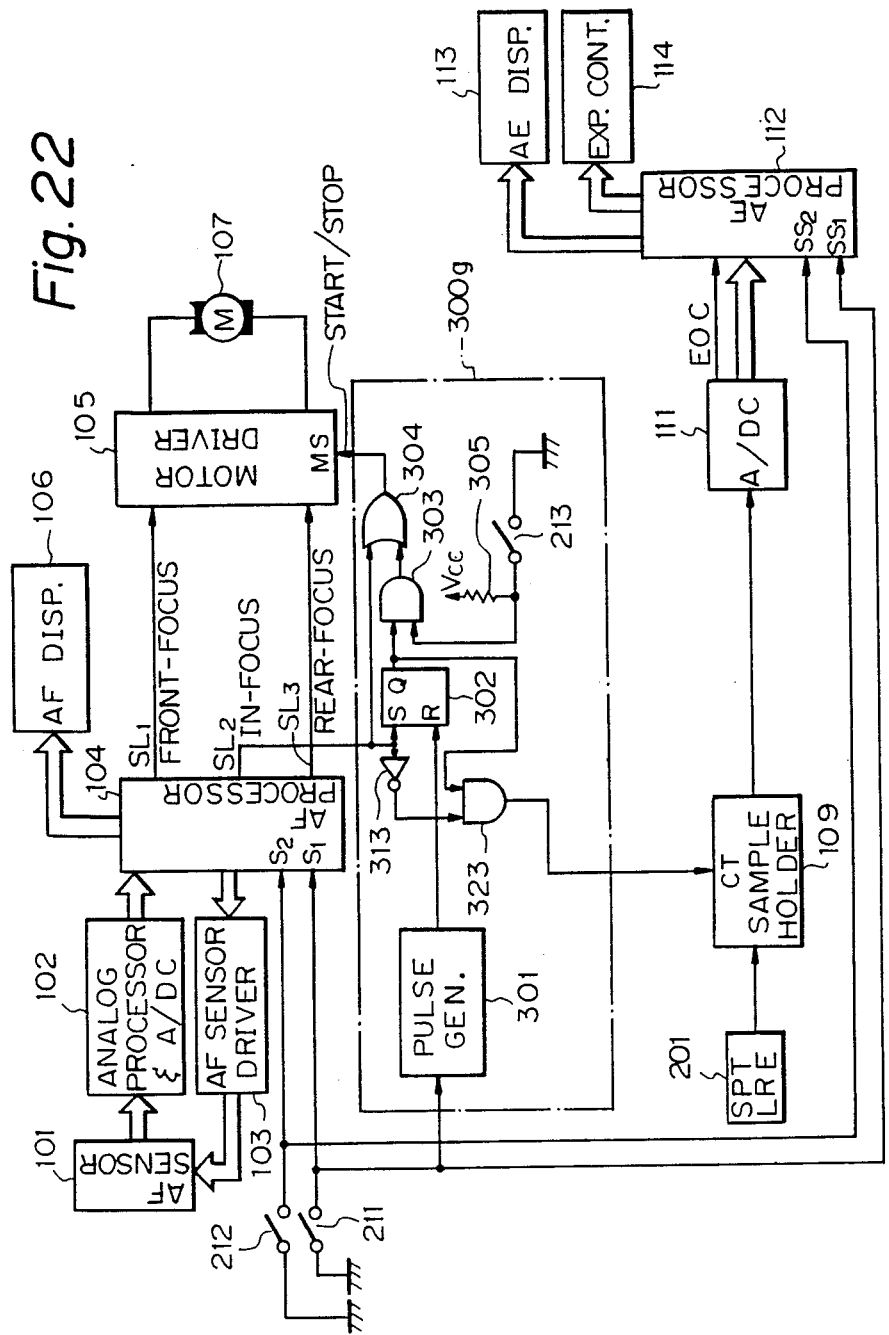
FIGS. 22, 23, and 24 are circuit diagrams of other specific embodiments of the circuit shown in FIG. 15.

FIG. 22 represents an alternative circuit to that shown in FIG. 17.

In FIG. 22, the averaged light measurement receiving element 202 and the multiplexer 110 are omitted from the circuit shown in FIG. 17. The OR gates 311 and 312 and the inverter 314 are also omitted, and an AND gate 323 is provided instead of the AND gate 310. The AND gate 323 has input terminals, one of which is connected to the positive output terminal Q of the FF 302 and another connected to the inverter 313, and an output terminal connected to the control terminal CT of the sample holder 109.

The AF mode selection switch 213 is closed to select the continuous AF mode. After that, the AF and AE start switch 212 is also closed. When the lens unit is in the out-of-focus condition, the sample holder 109 samples the spot metering data because the low level signal is supplied to the control terminal CT therein. After that, the lens unit first reaches the in-focus position, and subsequently, the high enable in-focus signal is output to the set terminal S of the FF 302. A high level signal from the FF 302 is supplied to one input terminal of the AND gate 323, but a low level signal is supplied to another input terminal of the AND gate 323 through the inverter 313. Accordingly, the sample holder 109 receives the low level signal from the AND gate 323 and continues to sample the spot metering data. Furthermore, when the lens unit moves out of focus, the low level in-focus signal is supplied to the inverter 313 and is changed to a high level thereat. The output of the FF 302 is maintained at a high level. The high level signal is supplied to the control terminal CT, holding the spot metering data at the sample holder 109.

Figure 23:
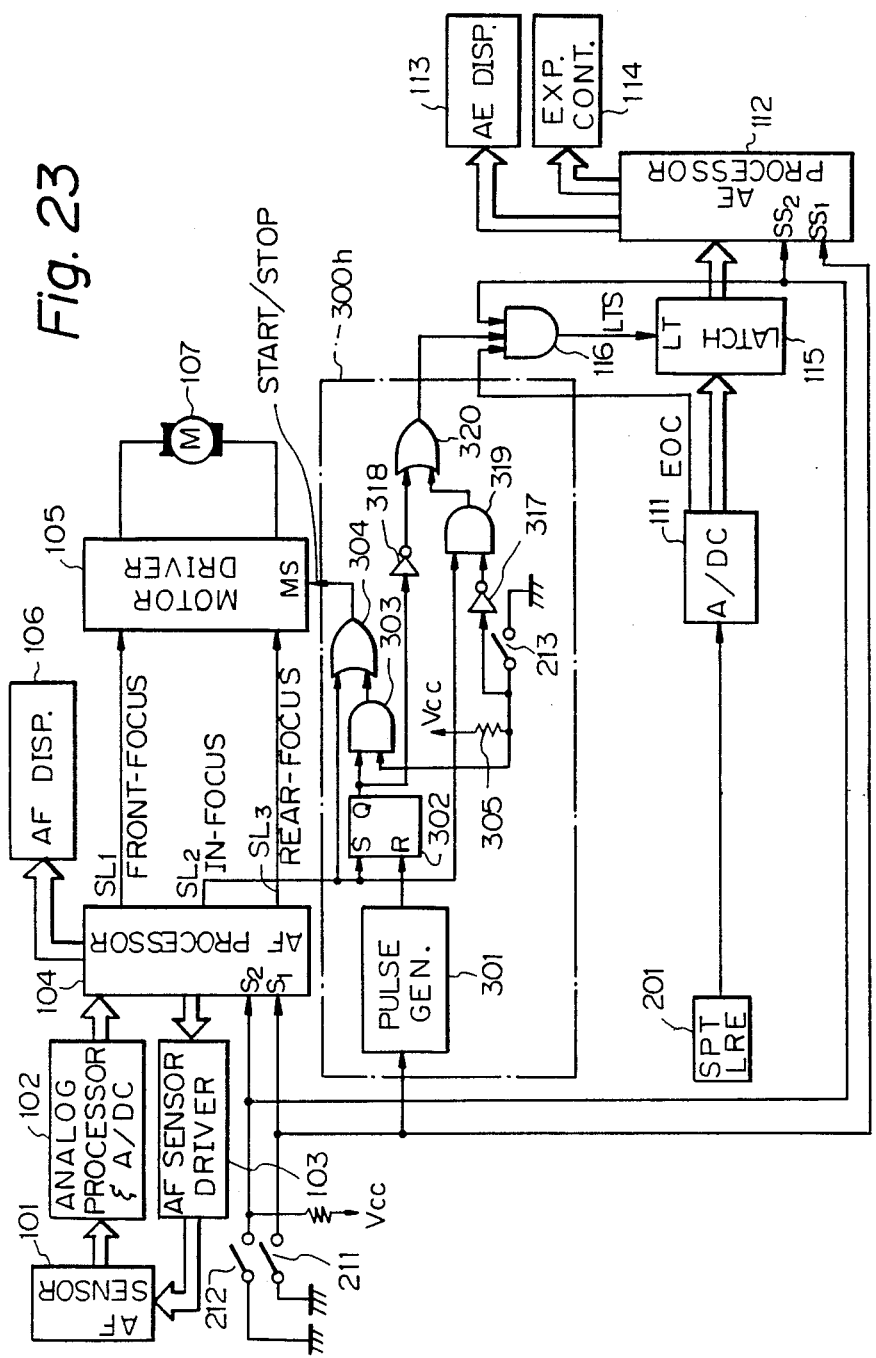

FIG. 23 also illustrates an alternative circuit to that shown in FIG. 18.

In FIG. 23, the averaged light measurement receiving element 202, the multiplexer 110, and the OR gate 321 are omitted from the circuit shown in FIG. 18.

The AF mode selection switch 213 is closed in the continuous AF mode, and thereafter, the AF and AE start switch 212 is closed. Before the lens unit reaches the in-focus position, the low level signal output from the FF 302 is changed to a high level signal at the inverter 318. Subsequently, a high level signal is supplied to the second input terminal of the AND gate 116. Before closing the release switch 212, the high level signal is supplied to the first input terminal of the AND gate 116. Upon receiving the pulse signal EOC, the latch circuit 115 updates and latches the spot metering data. This condition is continued when the lens unit reaches the in-focus position, because a high level signal is supplied to the second input terminal of the AND gate 116 through the inverter 317, the AND gate 319, and the OR gate 320. Furthermore, as the lens unit moves out of focus, the in-focus signal is made low level, outputting a low level signal at the AND gate 319. However, the FF 302 is maintained at the set status. The low level signal is output from the inverter 318. The latch circuit 115 stops the updating of the spot metering data and latches the previous spot metering data updated at a last time in the in-focus condition.

Figure 24:
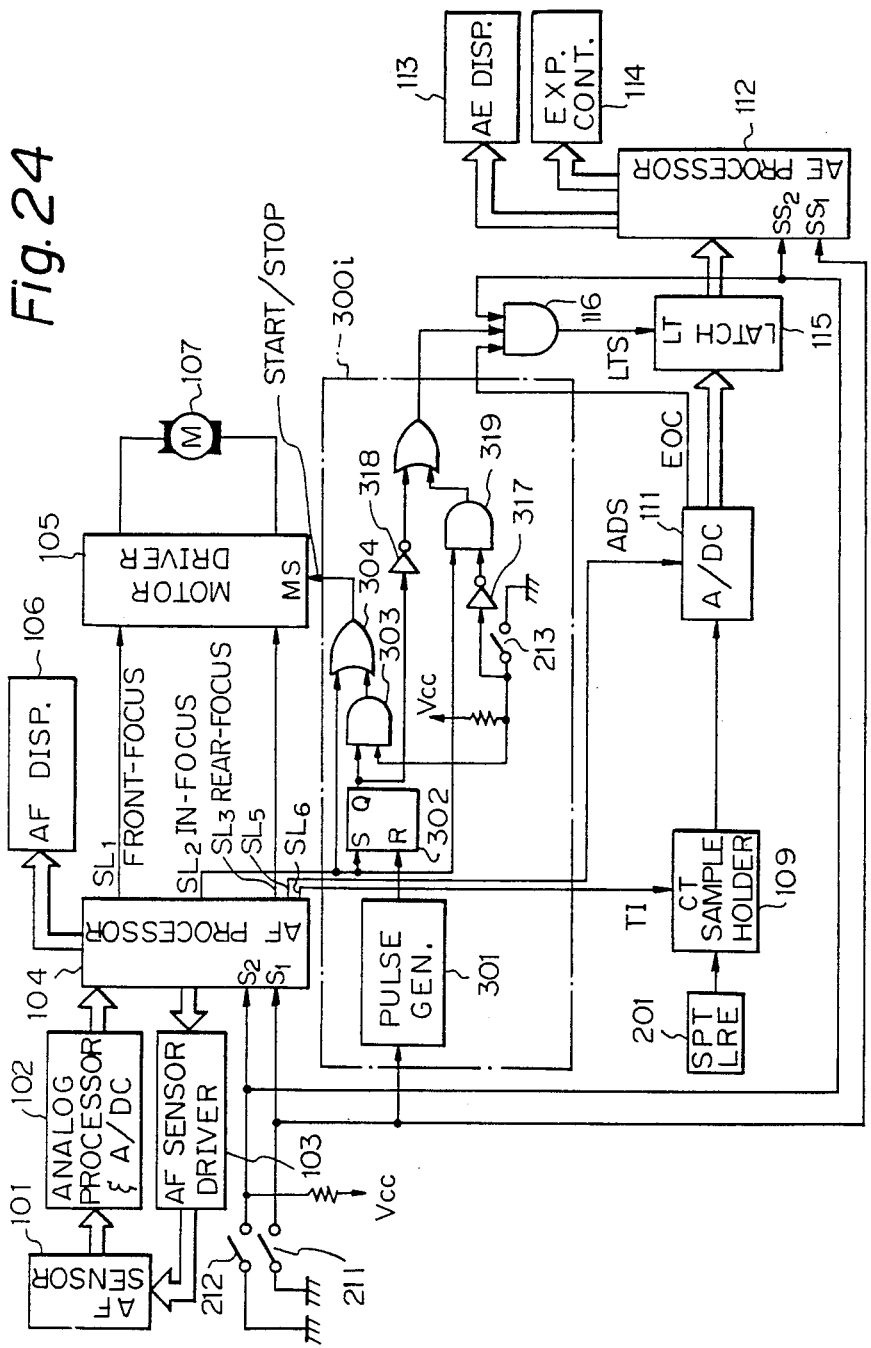

FIG. 24 further represents an alternative embodiment of the embodiment described with reference to FIG. 20.

In FIG. 24, the averaged light measurement receiving element 202, the multiplexer 110 and the OR gate 321 are omitted from the circuit shown in FIG. 20. The light measurement control circuit 300i is substantially identical to 300h in FIG. 23.

The operation in question may be applied to that in the above embodiment aforementioned with reference to FIG. 20, and accordingly, a description thereof is omitted.

Many widely different embodiments of the present invention may be constructed without departing from the spirit and scope of the present invention. It should be understood that the present invention is not limited to the conceptual and specific embodiments described in this specification, except as defined in the appended claims.

We claim:

1. A camera with an automatic focus and exposure (AF and AE) control means, comprising:
    means for detecting a focusing condition of an objective lens attached to the camera to produce a focusing signal indicative of the detected focusing condition;
    means for selecting either a first operation mode or a second operation mode;
    means, operatively connected to said detecting means and said selecting means, for focusing the objective lens in accordance with the focusing signal to produce an in-focus signal when the in-focus condition of the objective lens is established, the operation of the focusing means being interrupted after the in-focus condition has once been established when the first operation mode is selected, and the operation of the focusing means being repeated in accordance with the focusing signal even if an out-of-focus condition is detected again after the in-focus condition has once been established when the second operation mode is selected;
    first light measurement means for measuring light from a first measuring area corresponding to a focus detection area to produce a first light measuring signal indicative of an intensity of light measured, the light from the focus detection are being received by the detecting means for detecting the focusing condition of the objective lens;
    second light measurement means for measuring light coming from a second measuring area larger than the first measuring area to produce a second light measurng signal indicative of an intensity of light measured; and
    exposure control means, operatively connected to said first and second light measurement means, said selecting means and said focusing means, for controlling exposure amount on the basis of the first light measuring signal produced when the in-focus signal is produced in the condition in which the first operating mode is selected, and for controlling exposure amount on the basis of the second light measuring signal independently of the in-focus signal in the condition in which the second operation mode is selected.

2. A camera according to claim 1, wherein said selecting means includes an AF mode selection switch in which a switched state gives a first operation mode and another switched state gives a second operation mode.

3. A camera according to claim 1, wherein said first operation mode is a spot metering mode and said second operation mode is an average light measurement mode, and wherein said first light measurement means comprises a spot metering sensor and said second light measurement means comprises an averaged light measurement sensor.

4. A camera according to claim 1, further comprising a shutter release button providing a signal for initiating said focusing means and said exposure control means when said shutter release button is pushed down at a first stage, and also providing another signal for energizing said exposure control means to actually take a picture when said shutter release button is pushed down at a second stage.

5. A camera according to claim 1, wherein said AF and AE control means further comprises an AF display controlled by said detecting means and including a first indicator lit when said objective lens is in an in-focus condition, a second indicator lit when said objective lens is in a front focus condition away from said in-focus condition, and a third indicator lit when said objective lens unit is in a rear focus position away from said in-focus condition, both said second and third indicators being illuminated when the detecting means cannot detect the focusing condition of the objective lens.

6. A camera according to claim 1, wherein said AF and AE means further comprises an AE display controlled by said exposure control means and displaying the exposure control data from said exposure control means.

7. A camera according to claim 1, wherein said exposure control means, includes means for storing said first light measuring signal when said in-focus signal is produced in said first operation mode, said exposure being determined by data from said storing means.

8. A camera according to claim 7, where storing means includes a sample holder which holds said first light measuring signal when said in-focus signal is produced.

9. A camera according to claim 7, wherein storing means includes a latch circuit which latches said first light measuring signal when said in-focus signal is produced.

10. A camera according to claim 1, wherein said exposure control means, includes means for storing said first or second light measuring signal when said in-focus signal is produced, said exposure being determined by data from said storing means.

11. A camera with an automatic focus and exposure (AF and AE) control means, comprising:
    means for detecting a focusing condition of an objective lens attached to the camera to produce a focusing signal indicative of the detected focusing condition;
    means, operatively connected to said detecting means, for focusing the objective lens in accordance with the focusing signal to produce an in-focus signal when the in-focus condition of the objective lens is established, the operation of the focusing means being repeated in accordance with the focusing signal even if an out-of-focus condition is established again after the in-focus condition has once been detected;
    first light measurement means for measuring light coming from a first measuring area corresponding to a focus detection area to produce a first light measuring signal indicative of an intensity of light measured, the light from the focus detecting area being received by the detecting means for detecting the focusing condition of the objective lens;
    second light measurement means for measuring light coming from a second measuring area larger than the first measuring area to produce a second light maasuring signal indicative of an intensity of light measured; and
    exposure control means, operatively connected to said first and second light measurement means and said focusing means, for controlling exposure amount on the basis of the first light measuring signal when the in-focus signal is produced at a time of starting the exposure control operation, and for controlling exposure amount on the basis of the second light measuring signal when the in-focus signal is not produced at a time of starting the exposure control operation.

12. A camera according to claim 11, further comprising a shutter release button providing a signal for initiating said focusing means and said exposure control means when said shutter release button is pushed down to a first stage, and providing another signal for energizing said exposure control means to actually take a picture when said shutter release button is pushed down to a second stage.

13. A camera according to claim 11, wherein said AF and AE means further comprises an AF display controlled by said detcting means and including a first indicator lit when said objective lens is in an in-focus condition, a second indicator lit when said objective lens is in front-focus condition away from said in-focus condition, and a third indicator lit when said objective lens is in rear-focus position away from said in-focus condition, both said second and third indicators being illuminated when the detecting means cannot detect the focusing condition of the objective lens.

14. A camera according to claim 11, wherein said AF and AE means further comprises an AE display illuminated by said exposure control means, and displaying the exposure control data from said exposure control means.

15. A camera according to claim 11, wherein said first light measurement means comprises a spot metering sensor and said second light measurement means comprises an averaged light measurement sensor.

16. A camera according to claim 11, wherein said exposure control means includes means for storing said first light measuring signal when said in-focus signal is produced, said exposure being determined by data from said storing means.

17. A camera according to claim 16, wherein said storing means includes a sample holder which holds said first light measuring signal when said in-focus signal is produced.

18. A camera according to claim 16, wherein said storing means includes a latch circuit which latches said first light measuring signal when said in-focus signal is produced.

19. A camera according to claim 11, wherein said exposure control menas includes means for storing said first or second light measuring signal when said in-focus signal is produced, said exposure being determined by data from said storing means.

20. A camera according to claim 11, further comprising means for setting an initial condition for selecting data used for calculating said exposure, of either said first or second light measuring signal.

21. A camera with an automatic focus and expsoure (AF and AE) control means, comprising:
   means for detecting a direction of defocus of an objective lens and amount of defocus thereof with respect to a predetermined focal plane;
   means, operatively connected to said detecting means, for focusing the objective lens in accordance with the detected direction of defocus and the detected amount of defocus to stop the focusing of the objective lens and to produce an in-focus signal when the detected amount of defocus becomes smaller than a predetermined first amount;
   first light measurement means for measuring light coming from a first measuring area corresponding to a focus detection area to produce a first light measuring signal indicative of an intensity of light measured, the light from the focus detection area being received by the detecting means for detecting the direction of defocus and the amount of defocus of the objective lens;
   second light measurement means for measuring light coming from a second measuring area larger than the first measuring area to produce a second light measuring signal indicative of an intensity of light measured; and
   exposure control means, operatively connected to said first and second light measurement means, and said focusing means, for controlling exposure amount on the basis of the first light measuring signal when the in-focus signal is produced at a time of starting the exposure control operation, and for controlling exposure amount on the basis of the second light measuring signal when the in-focus signal is not produced at a time of starting the exposure control operation.

22. A camera according to claim 21, wherein said focusing means produces a semi in-focus signal when the detected amount of defocus becomes smaller than a predetermined second amount which is determined as being large than said predetermined first amount, and wherein said exposure control means controls exposure amount on the basis of said first light measuring signal when said semi in-focus signal is produced at a time of starting the exposure control operation.

23. A camera according to claim 21, comprising a shutter release button providing a signal for initiating said focus means and said exposure control means when said shutter release button is pushed down to a first stage, and also providing another signal for energizing said exposure control means to acutally take a picture when said shutter release button is pushed down to a second stage.

24. A camera according to claim 21, wherein said AF and AE means further comprises an AF display controlled by said detecting means and including a first indicator lit when said objective lens is in an in-focus condition, a second indicator lit when said objective lens is in a front-focus condition away from said in-focus condition, and a third indicator lit when said objective lens is in a rear-focus position away from said in-focus position, both said second and third indicators being illuminated when the detecting means cannot detect the direction of defocus and the amount thereof.

25. A camera according to claim 21, wherein said AF and AE means further comprises an AE display illuminated by said exposure control means, and displaying exposure control data from said exposure control means.

26. A camera according to claim 21, wherein said first light measurement means comprises a spot metering sensor and said second light measurement means comprises an averaged light measurement sensor.

27. A camera according to claim 21, wherein said exposure control means, includes means for storing said first light measuring signal when said in-focus signal is produced, said exposure being determined by data from said storing means.

28. A camera according to claim 27, wherein said storing means includes a sample holder which holds said first light measuring signal when said semi in-focus signal is produced.

29. A camera according to claim 27, wherein said storing means includes a latch circuit which latches said first light measuring signal when said semi-in-focus signal is produced.

30. A camera according to claim 21, wherein said exposure control means, includes means for storing said first or second light measuring signal when said semi-in-focus signal is produced, said exposure being determined by data from said storing means.

31. A camera according to claim 21, further comprising means for setting an intial condition for selecting data, used for claculating said exposure, of either said first or second light measuring signal.

32. A camera with an automatic focus and exposure (AF and AE) control means, comprising:
   means for detecting a focusing condition of an objective lens attached to the camera to produce a focusing signal indicative of the detected focusing condition;
   means, operatively connected to said detecting means, for focusing the objective lens in accordance with the focusing signal to produce an in-focus signal when the in-focus condition of the objecitve lens is established, the operation of the focusing means being repeated in accordance with the focusing signal even if an out-of-focus condition is detected again after the in-focus condition has once been detected;
   light measurement means for repeatedly measuring light coming from a measuring area corresponding to a focus detection area to repeatedly produce a light measuring signal indicative of an intensity of light measured, the light from which is received by the detecting means for detecting the focusing condition of the objective lens;
   means for updating said light measuring signal while said in-focus signal is produced and for storing a last light measuring signal when said in-focus signal is not produced; and
   means, operatively connected to said update and storing means, for controlling exposure amount on the basis of said stored light measuring signal.

33. A camera according to claim 32, further comprising a shutter release button providing a signal for initiating said focusing means and said exposure control means when said shutter release button is pushed down to a first stage, and providing another signal for energizing said exposure control means to actually take a picture when said shutter release button is pushed down to a second stage.

34. A camera according to claim 32, wherein said AF and AE means further comprises an AF display controlled by said detecting means and including a first indicator lit when said objecitve lens is in an in-focus condition, a second indicator lit when said objective lens is in a front-focus condition away from said in-focus condition, and a third indicator lit when said condition lens is in a rear-focus condition away from said in-focus condition, both said second and third indicators being illuminated when the detecting means cannot detect the focusing condition of the objective lens.

35. A camera according to claim 32, wherein said AF and AE means further comprises an AE display controlled by said exposure control means, and displaying exposure control data from said exposure control means.

36. A camera according to claim 32, wherein said light measurement means comprises a spot metering sensor.

37. A camera according to claim 32, wherein said exposure control means includes means for storing said light measuring signal when said in-focus signal is produced, or updating said light measuring signal, said exposure being determined by data from, said storing means.

38. A camera according to claim 37, wherein said storing means stores data of said light measuring signal after a predetermined time has elapsed from a time the in-focus signal is produced, said predetermined time being a response time of said detecting means, said focusing means and said light measurement means.

39. A camera according to claim 38, wherein said storing means includes a sample holder which holds said light measuring signal when said in-focus signal is produced.

40. A camera according to claim 38, wherein said storing means includes a latch circuit which latches said light measuring signal when said in-focus signal is produced.

41. A camera according to claim 32, wherein said exposure control means, further operatively connected to said detecting means, includes means for storing said light measuring signal when said in-focus signal is produced, said exposure being determined by data from said storing means.

42. A camera according to claim 41, wherein said storing means stores data of said light measuring signal after a predetermined time has elapsed from a time at which said in-focus signal is produced, said predetermined time being a response time of said detecting means, said focusing means and said light measurement means.

* * * * *

UNITED STATES PATENT AND TRADEMARK OFFICE
CERTIFICATE OF CORRECTION

PATENT NO. : 4,792,820

DATED : December 20, 1988

INVENTOR(S) : Toshio Norita et al

It is certified that error appears in the above-identified patent and that said Letters Patent is hereby corrected as shown below:

On the cover sheet of the patent, column 1, after the line which reads "[22] Filed: Sep. 11, 1986", insert --[30] Foreign Application Priority Data Sep. 13, 1985 [JP] Japan...........60-141127
Sep. 13, 1985 [JP] Japan...........60-141128
Sep. 19, 1985 [JP] Japan...........60-144051--.

Signed and Sealed this

Twenty-sixth Day of September, 1989

Attest:

DONALD J. QUIGG

Attesting Officer

Commissioner of Patents and Trademarks